(12) United States Patent
Maino et al.

(10) Patent No.: US 11,533,669 B2
(45) Date of Patent: Dec. 20, 2022

(54) ENTERPRISE NETWORK FABRIC EXTENSION ACROSS MOBILE NETWORKS

(71) Applicant: Cisco Technology, Inc., San Jose, CA (US)

(72) Inventors: Fabio R. Maino, Palo Alto, CA (US); Vina Ermagan, Marina Del Rey, CA (US); Marc Portoles Comeras, Mountain View, CA (US); John Martin Graybeal, Califon, NJ (US); Alberto Rodriguez Natal, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 248 days.

(21) Appl. No.: 16/395,817

(22) Filed: Apr. 26, 2019

(65) Prior Publication Data
US 2020/0344662 A1 Oct. 29, 2020

(51) Int. Cl.
*H04W 76/12* (2018.01)
*H04W 28/02* (2009.01)
*H04W 40/02* (2009.01)
*H04L 43/028* (2022.01)

(52) U.S. Cl.
CPC ........... *H04W 40/02* (2013.01); *H04L 43/028* (2013.01); *H04W 76/12* (2018.02)

(58) Field of Classification Search
CPC ............ H04L 43/028; H04W 28/0268; H04W 28/0273; H04W 40/02; H04W 76/12
See application file for complete search history.

(56) References Cited

U.S. PATENT DOCUMENTS

| 8,982,862 | B2 | 3/2015 | Gu |
| 9,055,557 | B1 | 6/2015 | Bayar et al. |
| 10,028,167 | B2 | 7/2018 | Calin et al. |
| 10,033,766 | B2 | 7/2018 | Gupta et al. |

(Continued)

FOREIGN PATENT DOCUMENTS

WO 2017176399 A1 10/2017

OTHER PUBLICATIONS

Michael Geller et al., "5G Security Innovation with Cisco", downloaded Apr. 26, 2019, 29 pages.

(Continued)

*Primary Examiner* — Raj Jain
*Assistant Examiner* — M Mostazir Rahman
(74) *Attorney, Agent, or Firm* — Edell, Shapiro & Finnan, LLC

(57) ABSTRACT

In one illustrative example, network fabric policy data associated with an application, subscriber, and/or device may be received. Mobile network policy data that corresponds to the received network fabric policy data may be selected, based on stored policy mappings between a set of network fabric policy profiles of a fabric network and a set of mobile network policy profiles of a mobile network. A bearer or Quality of Service (QoS) flow of the mobile network may be established in satisfaction of the selected mobile network policy data. In addition, a packet filter of a traffic flow template (TFT) or a packet detection rule (PDR) may be generated and applied in order to direct IP traffic flows associated with the application to the established bearer or QoS flow for communication in the mobile network.

20 Claims, 19 Drawing Sheets

(56) References Cited

U.S. PATENT DOCUMENTS

| | | | |
|---|---|---|---|
| 2013/0021905 A1 | 1/2013 | Schramm | |
| 2015/0003455 A1* | 1/2015 | Haddad | H04L 45/38 370/392 |
| 2015/0063166 A1* | 3/2015 | Sif | G06F 9/45558 370/254 |
| 2015/0071053 A1* | 3/2015 | Kempf | H04L 41/0695 370/216 |
| 2015/0215220 A1 | 7/2015 | Yiu et al. | |
| 2016/0105336 A1 | 4/2016 | Sinha et al. | |
| 2016/0262044 A1* | 9/2016 | Calin | H04L 45/64 |
| 2017/0026417 A1 | 1/2017 | Ermagan et al. | |
| 2017/0289046 A1* | 10/2017 | Faccin | H04L 47/805 |
| 2017/0359749 A1 | 12/2017 | Dao | |
| 2018/0139240 A1 | 5/2018 | Voit et al. | |
| 2018/0213472 A1 | 7/2018 | Ishii et al. | |
| 2020/0186477 A1 | 6/2020 | Pularikkal et al. | |
| 2021/0076250 A1* | 3/2021 | Wang | H04W 72/087 |

OTHER PUBLICATIONS

Gemalto, "A New Trust Model For The 5G Era", Apr. 2018, 14 pages.

Cisco, "Deploying Campus Security Group Tags", BRKCRS-2662, https://www.alcatron.net/Cisco%20Live%202013%20Melbourne/Cisco%20Live%20Content/Network%20Infrastructure%20And%20Systems/BRKCRS-2662%20%20Deploying%20Campus%20Security%20Group%20Tags.pdf, downloaded Mar. 4, 2019, 78 pages.

Vedran Hafner, Cisco, "Cisco Connect", Apr. 5-7, 2017, 65 pages.

Cisco, "Software-Defined Access Design Guide", Solution 1.2, Dec. 2018, 45 pages.

F. Maino, Ed. et al., "Generic Protocol Extension for VXLAN", draft-ietf-nvo3-vxlan-gpe-05, Network Working Group, Internet-Draft, Intended status: Informational, Oct. 30, 2017, 17 pages.

D. Meyer et al., "LISP Mobile Node", draft-meyer-lisp-mn-04.txt, Network Working Group, Internet-Draft, Intended status: Informational, Oct. 25, 2010, 22 pages.

M. Smith, "VXLAN Group Policy Option", draft-smith-vxlan-group-policy-04, Internet Engineering Task Force, Internet-Draft, Intended status: Informational, Oct. 20, 2017, 6 pages.

Juniper, "Juniper Networks Delivers EVPN-VXLAN Fabric to Connect Enterprise Data Center and Campus Networks", Jun. 28, 2018, 4 pages.

D. Farinacci et al., "The Locator/ID Separation Protocol (LISP)", Internet Engineering Task Force (IETF), Request for Comments: 6830, Category: Experimental, ISSN: 2070-1721, Jan. 2013, 75 pages.

Cisco, "The Network Intuitive", Cisco Enterprise Networks, Catalog vol. 5: Europe, Middle East, Africa and Russia, www.cisco.com/go/DNA, #networkintuitive, downloaded Apr. 26, 2019, 108 pages.

Cisco, "VXLAN Overview: Cisco Nexus 9000 Series Switches", C11-729383-01, Jan. 2015, 10 pages.

International Search Report and Written Opinion in counterpad International Application No. PCT/US2020/028631, dated Jun. 25, 2020, 13 pages.

S. Matsushima, "Segment Routing IPv6 for Mobile User Plane draft-ietf-dmm-srv6-mobile-uplane-02," DMM Working Group, Internet-Draft, Intended status: Standards Track, Jul. 2, 2018, 30 pages.

* cited by examiner

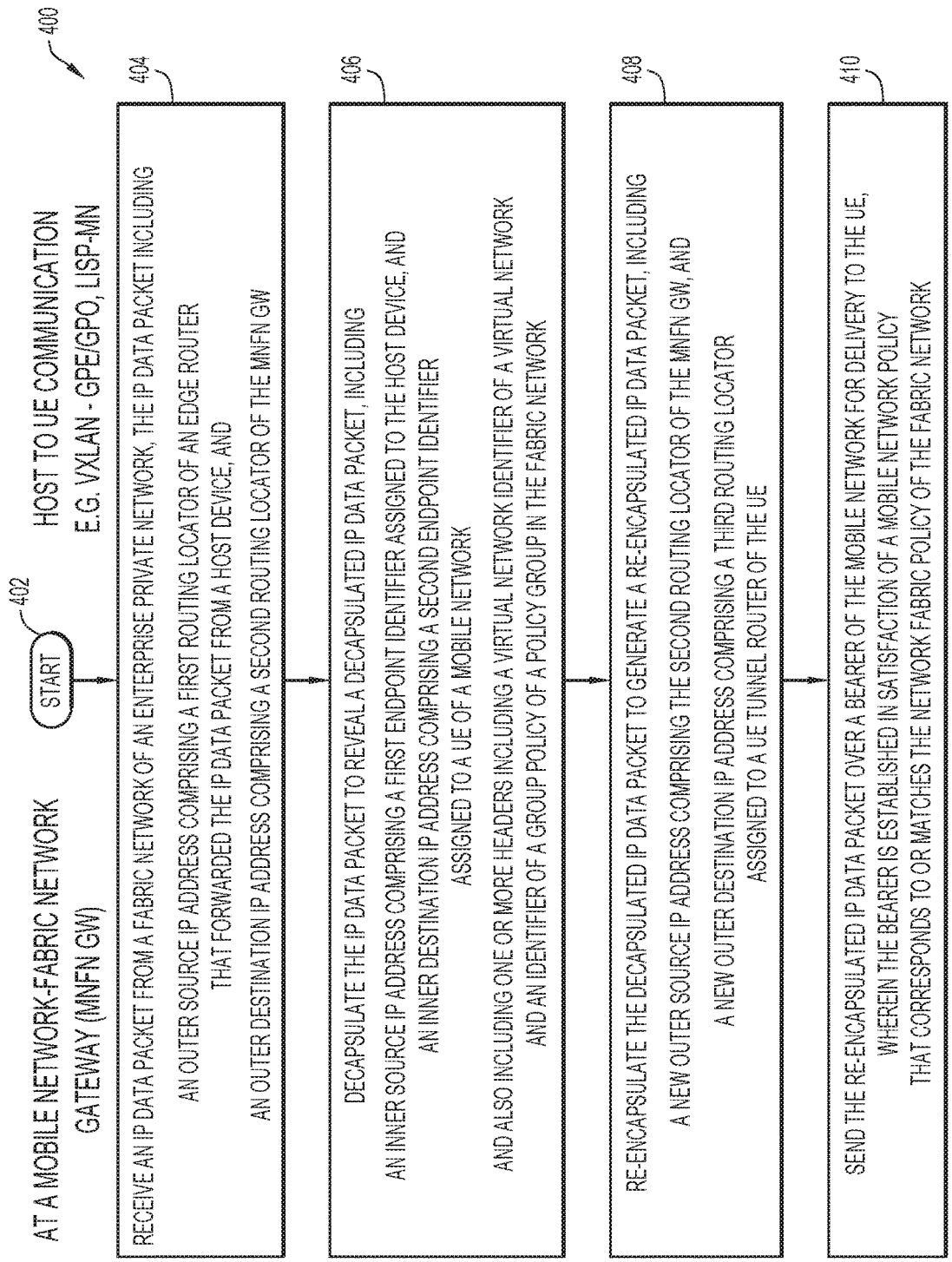

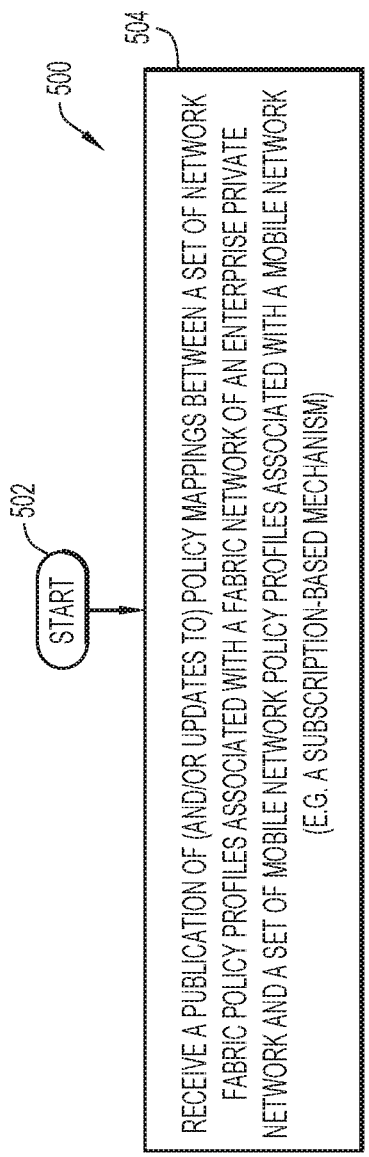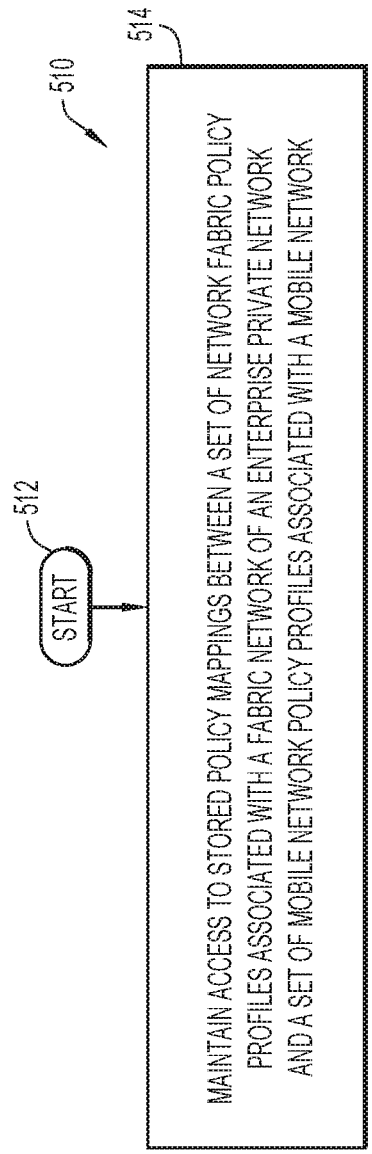

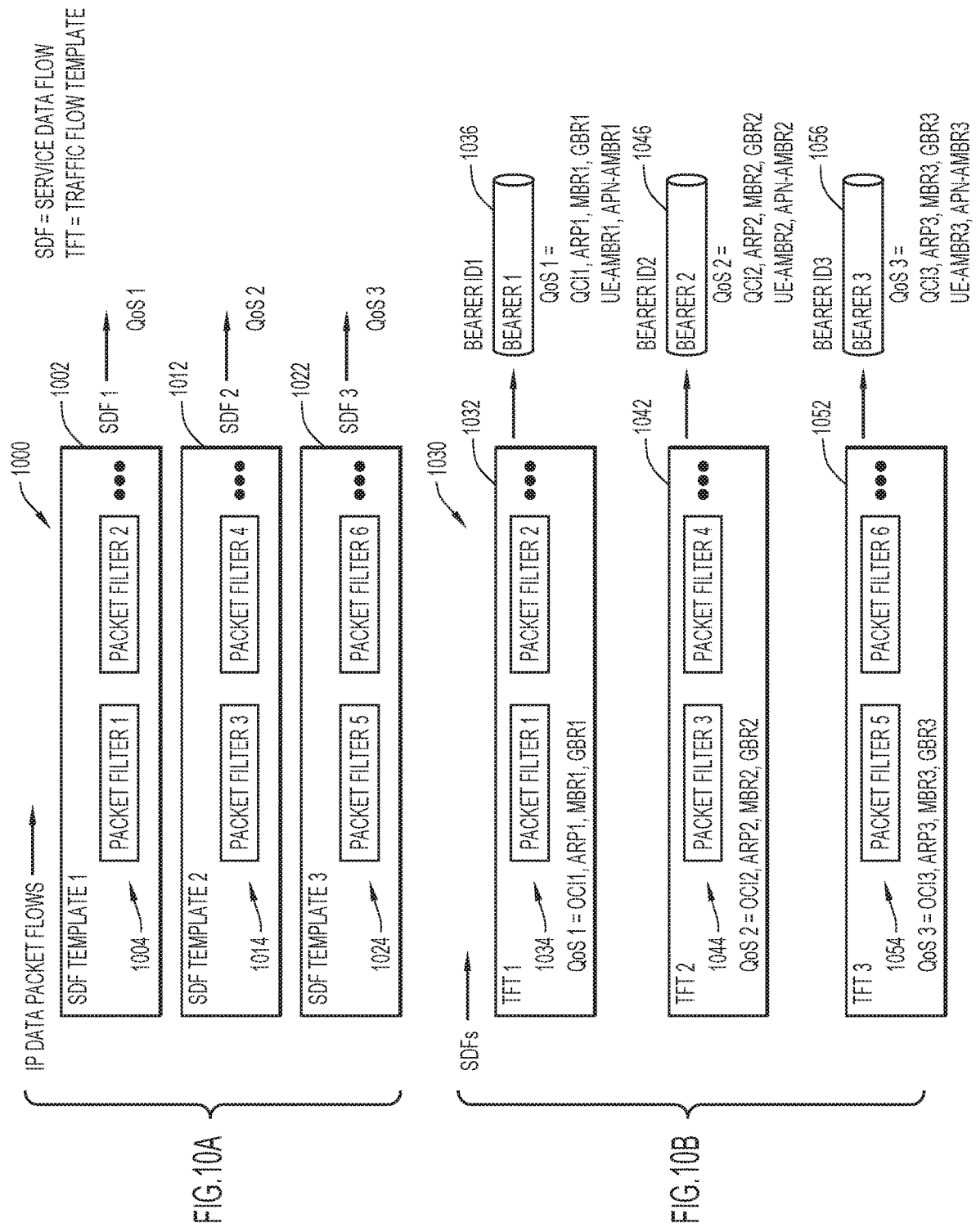

| QCI | RESOUCE TYPE | PRIORITY | PACKET DELAY BUDGET (MS) | PACKET ERROR LOSS RATE | EXAMPLE SERVICES |
|---|---|---|---|---|---|
| 1 | GBR | 2 | 100 | $10^{-2}$ | CONVERSATIONAL VOICE |
| 2 | GBR | 4 | 150 | $10^{-3}$ | CONVERSATIONAL VIDEO (LIVE STREAMING) |
| 3 | GBR | 5 | 300 | $10^{-6}$ | NON-CONVERSATIONAL VIDEO (BUFFERED STREAMING) |
| 4 | GBR | 3 | 50 | $10^{-3}$ | REAL-TIME GAMING |
| 5 | NON-GBR | 1 | 100 | $10^{-6}$ | IMS SIGNALING |
| 6 | NON-GBR | 7 | 100 | $10^{-3}$ | VOICE, VIDEO (LIVE STREAMING), INTERACTIVE GAMING |
| 7 | NON-GBR | 6 | 300 | $10^{-6}$ | VIDEO (BUFFERED STREAMING) |
| 8 | NON-GBR | 8 | 300 | $10^{-6}$ | TCP-BASED (FOR EXAMPLE, WWW, E-MAIL), CHAT, FTP, P2P FILE SHARING, PROGRESSIVE VIDEO AND OTHERS |
| 9 | NON-GBR | 9 | 300 | $10^{-6}$ | |

FIG.11

EXAMPLE CLASSIFICATION FOR A TRAFFIC FLOW TEMPLATE (TFT) HAVING PACKET FILTERS

1200

| UL PACKET FILTER ID | DED. RADIO BEARER ID | PACKET FILTER EVALUATION PRECEDENCE | PROTOCOL NUMBER (IPV4)/ NEXT HEADER (IPV6) | REMOTE ADDRESS AND SUBNET MASK | SINGLE LOCAL PORT (UE) | LOCAL PORT RANGE (UE) | SINGLE REMOTE PORT RANGE (NW) | REMOTE PORT RANGE | IPSEC SPI RANGE | TYPE OF SERVICE (IPV4)/ TRAFFIC CLASS (IPV6) AND MASK | FLOW LABEL (IPV6) |
|---|---|---|---|---|---|---|---|---|---|---|---|
| 1 | DRB2 | 6 | - | - | - | - | - | - | - | - | - |
| 2 | DRB2 | 2 | - | - | - | - | - | - | - | - | - |
| 3 | DRB3 | 7 | - | - | - | - | - | - | - | - | - |
| 4 | DRB3 | 3 | - | - | - | - | - | - | - | - | - |
| 5 | DRB3 | 5 | - | - | - | - | - | - | - | - | - |
| 6 | DRB3 | 1 | - | - | - | - | - | - | - | - | - |
| 7 | DRB3 | 6 | - | - | - | - | - | - | - | - | - |
| 8 | DRB1 (DEFAULT BEARER) | 255 | | | | | | | | | |

FIG.12

ENTERPRISE NETWORK FABRIC EXTENSION ACROSS MOBILE NETWORKS

TECHNICAL FIELD

The present disclosure relates generally to mobile networks and network fabrics of enterprise private networks, and more particularly to extending network fabrics of enterprise private networks across mobile networks for communication with user equipment (UE).

BACKGROUND

An enterprise private network may utilize software-defined access technology for many reasons. For example, software-defined access may provide for a policy-based automation from the edge to the cloud, with secure segmentation for users and "things" enabled through a single network fabric.

Unfortunately, however, traditional enterprise network fabrics do not extend across mobile networks (e.g. 4G/Long Term Evolution or "LTE" based mobile networks or 5G networks) for communication with user equipment (UE).

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a flowchart for describing a method for use in extending the network fabric across the mobile network according to some implementations of the present disclosure, which may be performed by the mobile network—fabric network gateway;

FIGS. 5A-5B are flowcharts for describing a method for use in extending the network fabric across the mobile network according to some implementations of the present disclosure, which may be performed by the mobile network—fabric network gateway or the UE;

FIGS. 10A-10B are illustrative representations of a plurality of Service Data Flow (SDF) templates and a plurality of Traffic Flow Templates (TFTs) according to some implementations of the present disclosure;

FIG. 11 is a table for showing relationships between different quality indicators of dedicated bearers and example services that may be associated therewith;

FIG. 12 is an illustrative representation of a TFT which includes example types of classification for filtering, mapping or directing IP traffic flows to their appropriate dedicated bearers;

DESCRIPTION OF EXAMPLE EMBODIMENTS

Figure 1A:
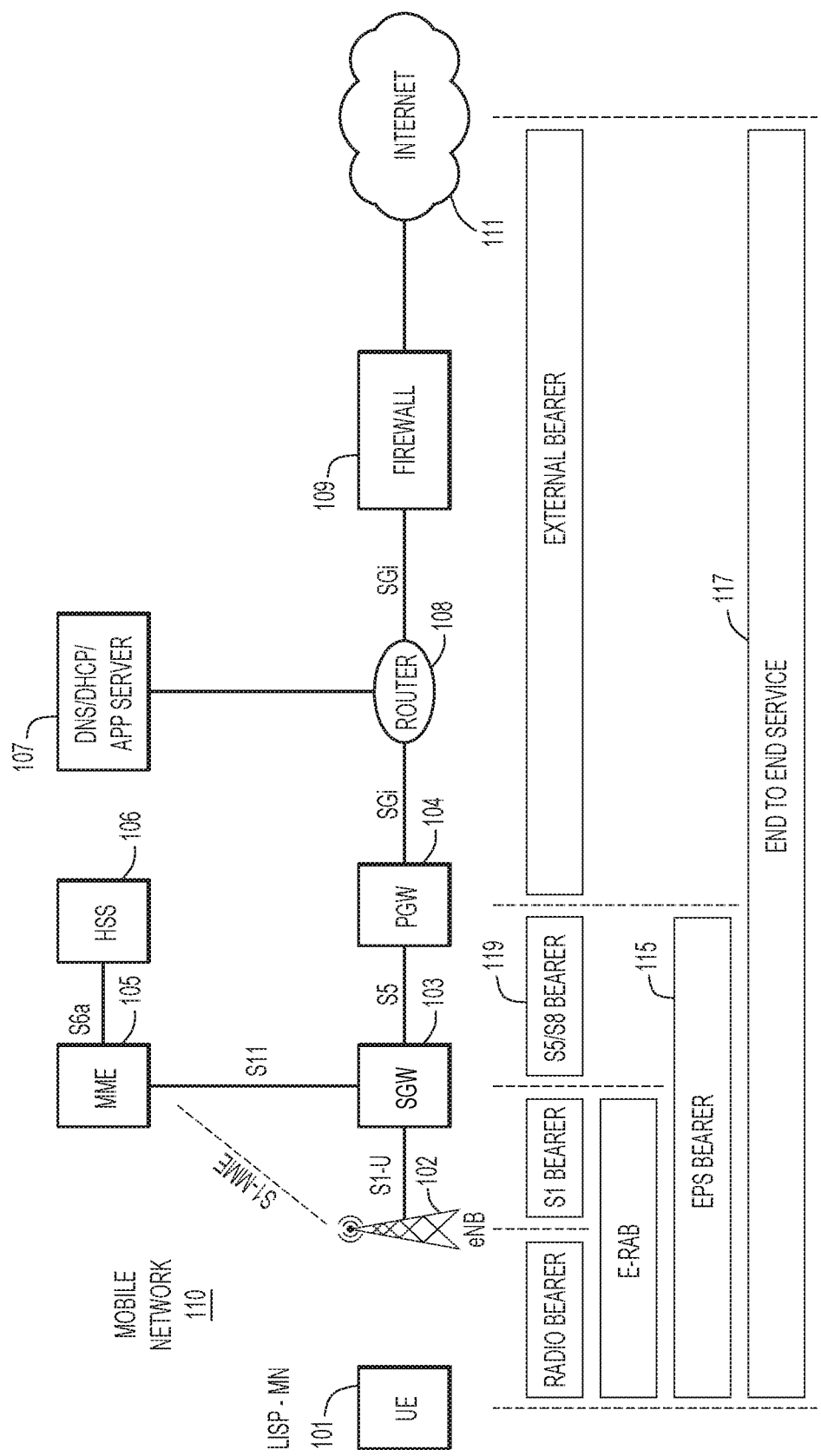
FIG. 1A is a representation of a communication system architecture which includes a 4G/Long-Term Evolution (LTE) based mobile network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques for use in extending network fabrics across mobile networks are described herein.

In one illustrative example, a technique may be performed by a mobile network—fabric network gateway and/or a user equipment (UE) operating in the mobile network. Policy mappings between a set of network fabric policy profiles of a fabric network of an enterprise private network and a set of mobile network policy profiles of a mobile network may be stored. At the mobile network—fabric network gateway or UE, network fabric policy data associated with an application, user, and/or device may be received. Mobile network policy data that corresponds to the received network fabric policy data may be selected, based on the stored policy mappings between the set of network fabric policy profiles and the set of mobile network policy profiles. A bearer or Quality of Service (QoS) flow of the mobile network may be established in satisfaction of the selected mobile network policy data. In addition, a packet filter of a traffic filter template (TFT) or a packet detection rule (PDR) may be generated and applied in order to direct IP traffic flows associated with the application to the established bearer or QoS flow of the mobile network.

More detailed and alternative techniques and implementations are provided herein as described below.

Example Embodiments

Techniques for enterprise fabric extension over mobile networks are described herein. The techniques may be configured for use with any suitable type of fabric network implemented in relation to an enterprise private network (e.g. a software-defined access network), as well as any suitable type of mobile network.

In an illustrative example of the present disclosure, the techniques are applied to a 4G, Long Term Evolution (LTE) based mobile network. To better illustrate, FIG. 1A is a representation of a communication system architecture 100A which includes a 4G/LTE based mobile network 110. Mobile network 110 of FIG. 1A is shown to include a user equipment (UE) 101, an Evolved Universal Mobile Telecommunications System (UMTS) Terrestrial Radio Access Network (E-UTRAN) Node B (eNB) 102, a Serving Gateway (S-GW) 103, a Packet Data Network (PDN) Gateway (GW) (P-GW) 104, a Mobility Management Entity (MME) 105, a Home Subscriber Server (HSS) 106, a Dynamic Host Configuration Protocol (DHCP) or Domain Name System (DNS) server 107, a router 108, a firewall 109, and the Internet 111.

UE 101 may be any suitable device used directly by an end-user to communicate via mobile network 110. For example, UE 101 may be a smartphone, a cellphone, a laptop computer equipped with a mobile broadband adapter, a cellular Internet of Things (IoT) device, or any other suitable device. UE 101 may communicate in mobile network 110 via the eNB 102. The eNB 102 may interface with a System Architecture Evolution (SAE) core, also known as the Evolved Packet Core (EPC), as well as other eNBs. For example, the eNB 102 may use an S1-AP protocol on an S1-MME interface with MME 105 for control plane traffic. The eNB 102 may also use a General Packet Radio Service (GPRS) Tunneling Protocol GTP-U, which is the defining IP-based protocol of the GPRS core network protocol, on the S1-U interface with S-GW 103 for user plane traffic. Together, the S1-MME and S1-U interfaces are known as the S1 interface, which represents the interface from eNB 102 to the EPC.

The interface between S-GW 103 and the MME 105 is the S11 interface. S-GW 103 may terminate the interface toward the RAN, and may route data packets between the RAN and the EPC. S-GW 103 may be a local mobility anchor point for inter-eNB handovers, and also may provide an anchor for inter-3GPP mobility. MME 105 may manage mobility aspects for access, such as for gateway selection and tracking area list management. The interface between MME 105 and HSS 106 is the S6a interface. The interface between P-GW 104 and router 108, and between the router 108 and firewall 109, is the SGi interface.

P-GW 104 may terminate the SGi interface toward the PDN, and may route data packets between the EPC and an external PDN (not shown). P-GW 104 may be a key node for policy enforcement and charging data collection. It may also provide an anchor point for mobility with non-LTE accesses. The external PDN may be any kind of IP network, such an IP Multimedia Subsystem (IMS) domain. Note that P-GW 104 and S-GW 103 may be implemented in one physical node or separate physical nodes.

Various bearers (i.e. carriers) may be used to provide an end-to-end service 117 from UE 101 to the Internet 111. An uplink (UL) Traffic Flow Template (TFT) in UE 101 may bind a traffic flow or a Service Data Flow (SDF) to an Evolved Packet System (EPS) bearer 115 in the UL direction. Multiple traffic flows may be multiplexed onto the same EPS bearer 115 by including multiple uplink packet filters in the UL TFT. On the other hand, a downlink (DL) TFT in P-GW 104 may bind a traffic flow to an EPS bearer 115 in the DL direction. Multiple traffic flows may be multiplexed onto the same EPS bearer 115 by including multiple downlink packet filters in the DL TFT.

An Enhanced Radio Access Bearer (E-RAB) may transport the packets of an EPS bearer 115 between UE 101 and S-GW 103 in the EPC. When an E-RAB exists, there may be a one-to-one mapping between this E-RAB and EPS bearer 115. A data radio bearer may transport the packets of EPS bearer 115 between UE 101 and eNB 102. When a data radio bearer exists, there may be a one-to-one mapping between this data radio bearer and EPS bearer 115 or the E-RAB. An S1 bearer may transport the packets of the E-RAB between eNB 102 and S-GW 103. An S5/S8 bearer 119 may transport the packets of EPS bearer 115 between S-GW 103 and P-GW 104.

UE 101 may store a mapping between an UL packet filter and a data radio bearer to create a binding between a traffic flow and a data radio bearer in the UL direction. P-GW 104 may store a mapping between a DL packet filter and the S5/S8a bearer 119 to create a binding between a traffic flow and the S5/S8a bearer 119 in the DL direction. The eNB 102 may store a one-to-one mapping between a data radio bearer and the S1 bearer to create a binding between a data radio bearer and the S1 bearer in both the UL and DL directions. S-GW 103 may store a one-to-one mapping between the S1 bearer and S5/S8a bearer 119 to create a binding between the S1 bearer and S5/S8a bearer in both the UL and DL directions.

A PDN connection may be comprised of several EPS bearers, where each EPS bearer has a TFT associated with it. When UE 101 needs to send an UL data packet, it checks the packet filters across all TFTs to determine whether there is a match with one of them. Each packet filter may include a packet filter evaluation precedence. In some embodiments, UE 101 checks the packet filters starting with the one having the highest evaluation precedence. As soon as UE 101 finds a match, it may deliver the data packet to the associated EPS bearer 115 for UL transmission. The same or similar process may be applied in P-GW 104 for the DL. Packets that do not match any packet filters may be left for the default bearer or discarded.

Each bearer may be associated with a Quality of Service (QoS) level. During the establishment of a dedicated bearer, network resources of the particular QoS may be allocated. Traffic shaping techniques may be employed based on the QoS level in order to limit the flow or bandwidth. Dedicated bearers may be associated with a guaranteed bit rate (GBR)

or a non-GBR. Packet losses related to congestion typically do not occur with GBR bearers. GBR bearers may be suitable for services such as voice call services. Non-GBR bearers do not guarantee bit rate and therefore services utilizing non-GBR bearers should prepare for packet losses related to congestion. Non-GBR bearers may be suitable for services such as e-mail services.

Each EPS bearer may be associated with a QoS class identifier (QCI). A QCI specifies the QoS treatment of user plane flows that are associated with the bearer. QCI characteristics include the packet delay budget, priority, and packet error loss rate. QoS parameters include a GBR, a maximum bit rate (MBR), and an allocation and retention policy (ARP). If there are limited resources, then the mobile network may use the ARP to decide whether accept or reject the new bearer establishment or modification request. For non-GBR bearers, the operator may restrict the total amount of bit-rate consumed by a single user with use of an aggregated maximum bit rate (AMBR).

Figure 1B:
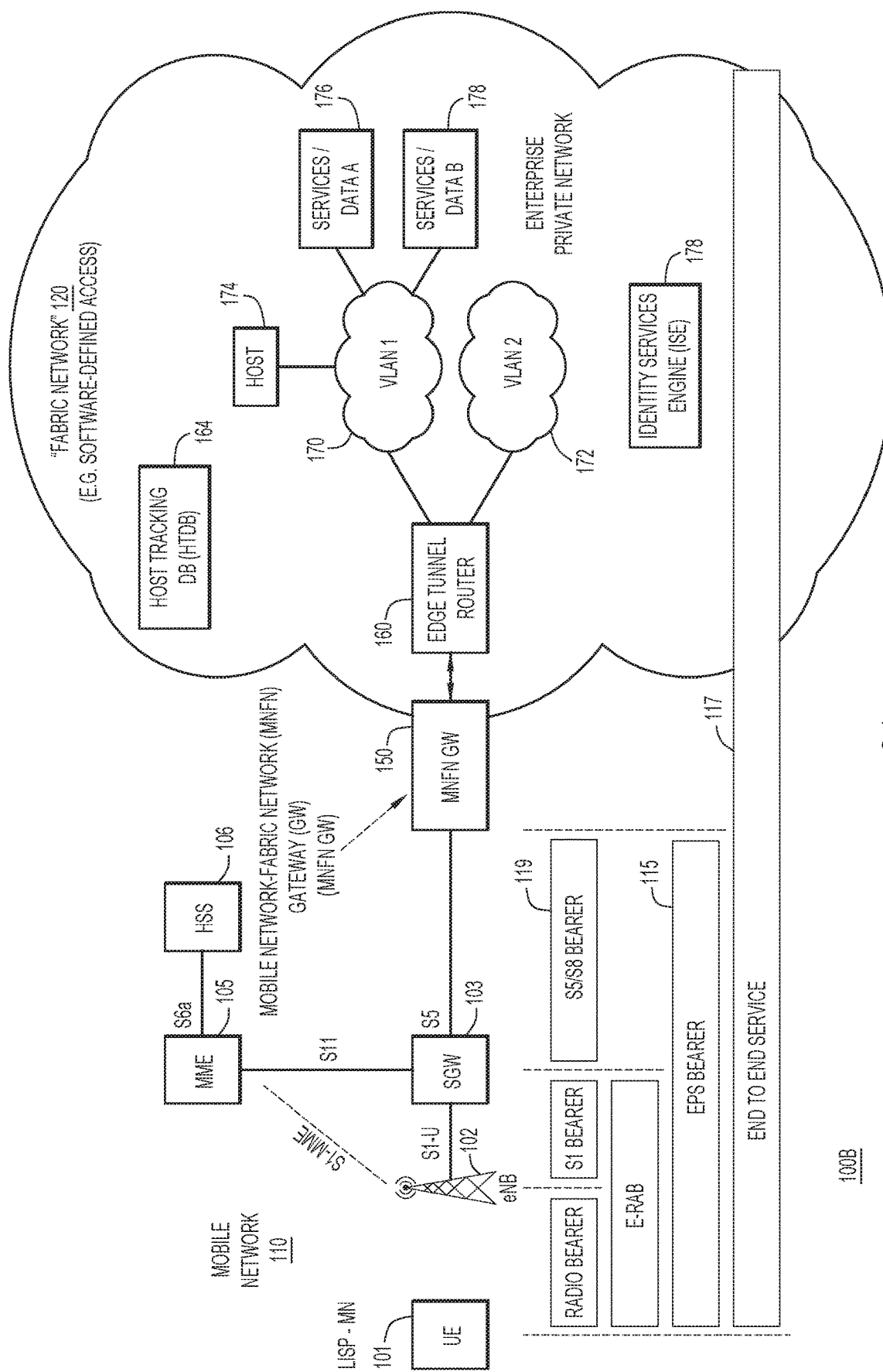
FIG. 1B is a representation of a communication system architecture which includes the mobile network of FIG. 1A, and further includes an interconnection (e.g. a mobile network—fabric network gateway or "MNFN GW") with a fabric network of an enterprise private network, such that the fabric network may be extended across the mobile network for communications with user equipment (UE) according to some implementations of the present disclosure.

FIG. 1B is a representation of a communication system architecture 100B which involves the mobile network 110 of FIG. 1A, but further includes an interconnection for fabric network communications of a fabric network (FN) 120 of an enterprise private network. Notably in FIG. 1B, fabric network 120 may be extended across the mobile network 110 for communication with UEs, such as UE 101, through use of a mobile network—fabric network gateway 150 (or "MNFN GW") according to some implementations of the present disclosure.

In some implementations, fabric network 120 of the enterprise private network may be defined as part of a software-defined access network. In some implementations, the software-defined access network may allow for segmentation of the network into a plurality of virtual networks or VLANs according to a virtual network identifier, as well as micro-segmentation of each virtual network into a plurality of policy groups according to a group identifier.

In some preferred implementations, the enterprise private network may be configured with Software-Defined Access (SD-Access) to further provide an intent-based networking solution for an enterprise. SD-Access may provide an automated end-to-end segmentation to separate user, device, and application traffic to existing (legacy) networks. SD-Access may automate user access policy so that organizations may make sure the proper policies are established for any user or device with any suitable application across the network.

To better illustrate in relation to FIG. 1B, the enterprise private network is shown to be segmented (e.g. macro-segmented) into a plurality of virtual networks, including VLANs 170 and 172. Further, each virtual network may be micro-segmented into a plurality of groups or policy groups. For example, a first group in VLAN 170 may be permitted access only to a set 176 of services, applications, and data (e.g. Services/Data A, or "marketing group") and a second group in VLAN 170 may be permitted access only to a set 178 of services, applications, and data (e.g. Services/Data B, or "IT group").

In some implementations, the identifier of the virtual network may comprise a virtual extensible local area network (VXLAN) identifier (VNI) of a VXLAN (or more generally, a VLAN ID or "VN ID" or a VLAN); and the identifier of the group or policy group may comprise a scalable group tag (SGT) of a scalable group (formerly, "security group"). In some preferred implementations, techniques of the present disclosure may be implemented with use of VXLAN-Generic Protocol Extension (GPE) or VXLAN-Group Policy Option (GPO) for the data-plane. Protocols associated with these technologies are described in various published documents including *Generic Protocol Extension for VXLAN*, Internet Engineering Task Force (IETF) Internet-Draft, draft-ietf-nvo3-vxlan-gpe-05, by F. Maino et al., Oct. 30 2017; *VXLAN Group Policy Option*, IETF Internet-Draft, draft-smith-vxlan-group-policy-03, by M. Smith et al., Feb. 6 2017; which are hereby incorporated by reference as though fully set forth herein.

Further in some implementations, techniques of the present disclosure may be implemented with use of Locator ID/Separation Protocol (LISP) Mobile Node (MN) for the control-plane. In general, LISP provides two namespaces, an End-point Identifier (EID) namespace and a Routing Locator (RLOC) namespace. Typically, a host (e.g. a computer or a server) may be associated with an EID (e.g. an IP address) and a router may be associated with an RLOC (e.g. an IP address). A router may be an ingress tunnel router (ITR), an egress tunnel router (ETR), or a combination thereof (ITR+ ETR=XTR). Protocols associated with these technologies are described in various published documents including *The Locator/ID Separation Protocol (LISP)*, IETF, Request for Comments: 6830; D. Farinacci et al., January 2013, and *LISP Mobile Node*, IETF Internet-Draft, draft-meyer-lisp-mn-06, by D. Farinacci et al., Oct. 24, 2011, which are hereby incorporated by reference as though fully set forth herein.

Figure 2A:
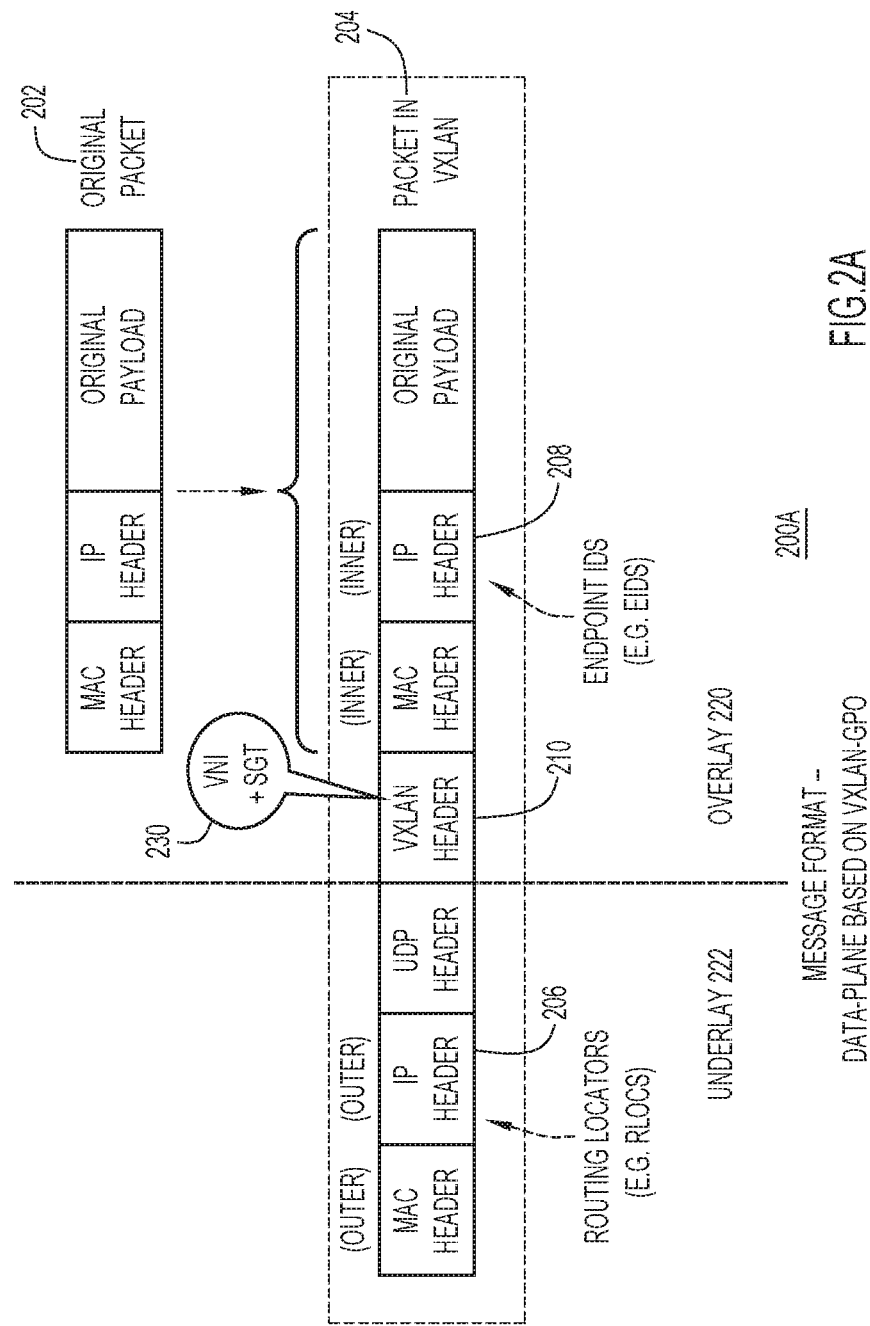
FIGS. 2A-2B are example message formats for IP data packets of IP traffic flows for macro-segmentation and micro-segmentation according to some implementations of the present disclosure.
Figure 2B:
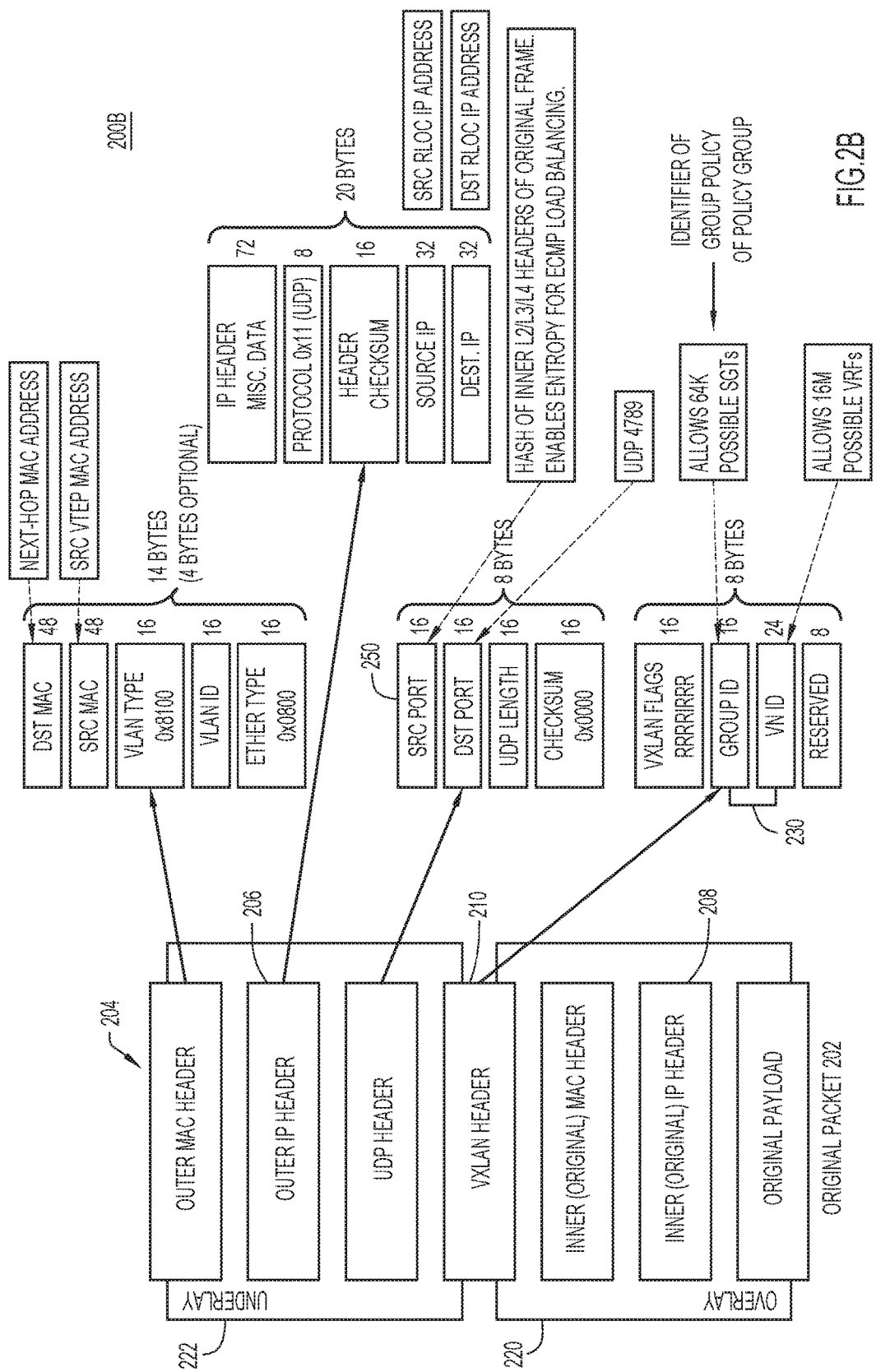

To better illustrate message formatting with reference to FIGS. 2A-2B, what are shown are example message formats 200A, 200B for IP data packets according to the macro-segmentation (e.g. VNI) and micro-segmentation (e.g. SGTs) of some implementations of the present disclosure. The following-described formatting provides for an overlay 220. An original packet 202 may include at least an (inner) IP header 208 and an original payload. The (inner) IP header 208 may include source and destination IP addresses of the endpoints (e.g. EIDs) (e.g. host device of the fabric network and the UE of the mobile network). For macro-segmentation, one or more (e.g. VXLAN) headers 210 may be applied to the original packet 202. As indicated, the one or more (e.g. VXLAN) headers 210 may include at least a VNI of the VXLAN and the SGT of the policy group (see metadata 230). The following-described formatting provides for an underlay 222. For encapsulation and tunneling, an (outer) IP header 206 may be applied to form an encapsulated packet 204. The outer IP header 206 may include source and destination IP address of the routing locators (e.g. RLOCs). As a UE may be assigned a (e.g. a static, unique) EID as well as a dynamically-assigned RLOC for its own tunnel router per LISP MN, IP data packet communications to and from the UE will use the RLOC of the UE tunnel router as well as the EID of the UE.

Accordingly, in some implementations, an IP traffic flow associated with an application of the fabric network may involve communication of a plurality of IP data packets, where each IP data packet comprises an outer IP data packet that encapsulates an inner IP data packet, and where the inner IP data packet has one or more headers which include the identifier of the virtual network and the identifier of the group policy of the policy group. The inner IP data packet may include source and destination IP addresses of the endpoints (e.g. EIDs), whereas the outer IP data packet may include source and destination IP address of the routing locators (e.g. RLOCs). According to LISP-MN, since a UE is assigned with a (e.g. a static, unique) EID as well as a dynamically-assigned RLOC for its tunnel router, IP data packet communications to and from the UE will use the RLOC of the UE tunnel router as well as the EID of the UE.

Figure 1C:
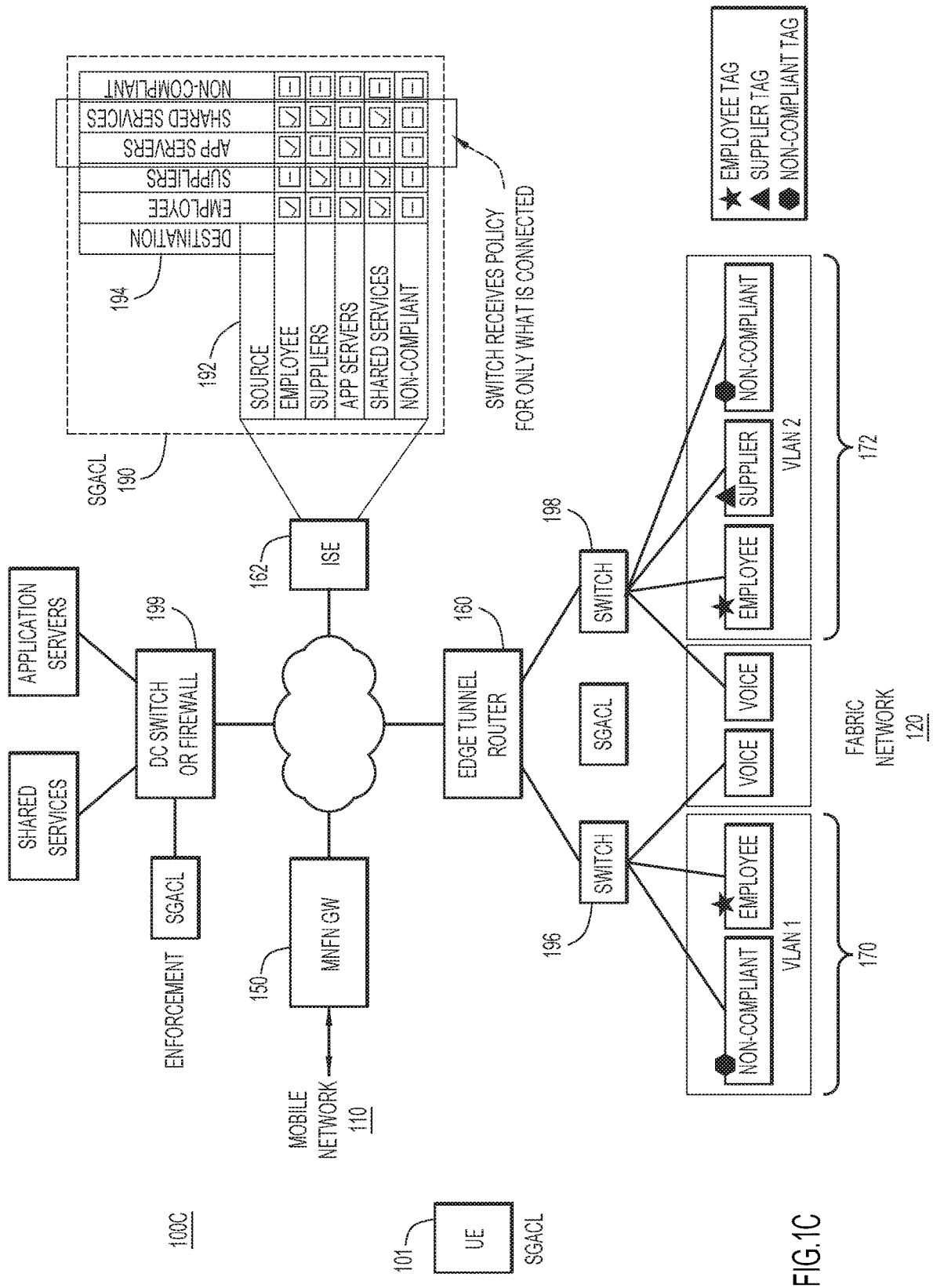
FIG. 1C is an illustrative representation of an example network node arrangement for the fabric network of the enterprise private network of FIGS. 1B-1C, illustrating use of a scalable group access control list (SGACL) for enforcement of group-based policies.

Referring now to FIG. 1C, what is shown is an illustrative representation of an example network node arrangement 100C for the fabric network 120 of the enterprise private network of FIG. 1B, to further illustrate use of a scalable group access control list (SGACL) 190 for enforcement of group-based polices.

In particular, FIG. 1C is shown to include an Identity Services Engine (ISE) 162 configured to provide identity management across a variety of different types of endpoint devices and applications. ISE 162 includes a mechanism that enables the creation and enforcement of security and access policies for the endpoint devices which may be connected to routers and switches in the enterprise. More particularly, ISE 162 may provide for SGACLs (e.g. SGACL 190) which are policies matrices that may be pushed to network nodes (e.g. switches 196, 198, and 199). UE 101 may further receive and utilize one or more SGACLs. Here, each user or device may be assigned to a group referred to as an endpoint ID group (EIG) that is defined by an SGT or like metadata. EIGs may be used to manage address-independent group-based policies. Network nodes (e.g. switches 196, 198, 199, as well as UE 101) may use SGTs to enforce their (local) SGACLs to provide for control over access and permissions.

In FIG. 1C, ISE 162 may provide SGACL 190 which is illustrated as a policy matrix having a source column 192 associated with sources and a destination column 194 associated with destinations. Source column 192 of the policy matrix includes employee, supplies, application servers, shared services, and non-compliant; and similarly, destination column 194 of the policy matrix includes employee, supplies, application servers, shared services, and non-compliant. An indication for access or permission is provided each the intersection of any particular source-destination combination. In some implementations, a node or switch may receive limited policy data for only what is connected in the network.

As described earlier, techniques of the present disclosure may be implemented with use of LISP MN for the control-plane. As indicated in FIGS. 1B-1C, one or more routers or edge tunnel routers 160 may be configured to provide tunneling, encapsulation and decapsulation as described herein. A host tracking database (HTDB) 164, referred to as a map-server (MS) and map-resolver (MR) (MS/MR) in LISP, may further be used to provide the network(s) the ability to determine the location of a user or device (e.g. UE 101). With LISP MN, UE 101 may be assigned a (e.g. static, unique) EID as well as a dynamically-assigned RLOC for its own tunnel router; IP data packet communications to and from the UE 101 will use the RLOC of the UE tunnel router as well as the EID of the UE.

Figure 3A:
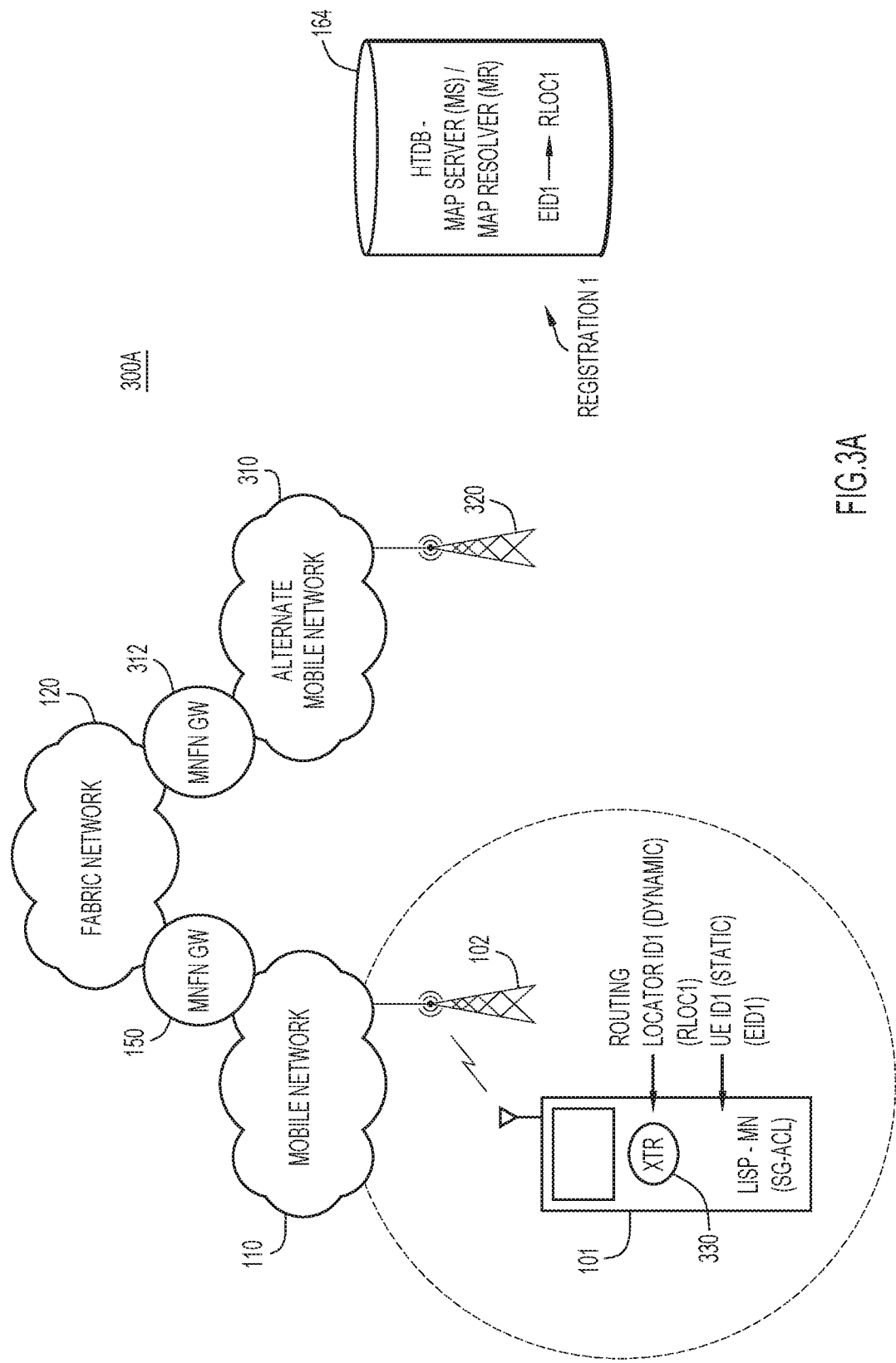
FIGS. 3A-3B are illustrative representations of some basic concepts associated with Locator ID/Separation Protocol (LISP) and LISP Mobile Node (LISP-MN) according to some implementations of the present disclosure.
Figure 3B:
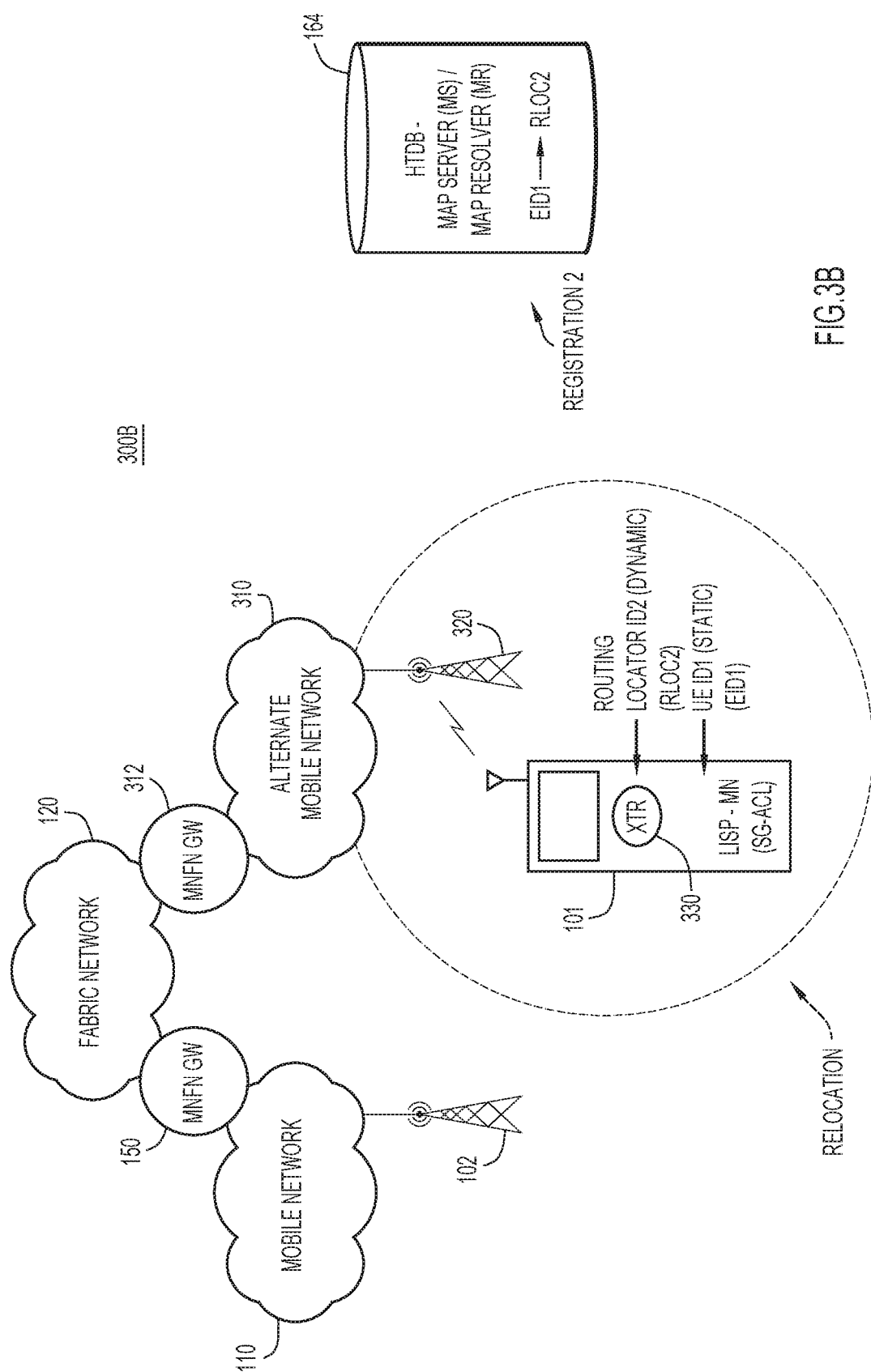

To better explain, FIGS. 3A-3B are illustrative representations 300A, 300B of some basic architecture concepts and components associated with LISP MN. In FIG. 3A, basic components may include UE 101 configured to operate as a LISP-MN and having a (e.g. UE or MN) tunnel router 330, and the HTDB 164 which may be or include the MS/MR and having EID-to-RLOC mappings.

UE 101 which is considered a LISP-MN has a "light-weight" LISP implementation. A LISP-MN typically sends and receives LISP encapsulated packets, implementing ITR and ETR functionality to make the single mobile node (i.e. the UE 101) appear to operate as a LISP site. A LISP-MN is typically provisioned with one or more EIDs that it uses for all transport connections. LISP-MN EIDs may be provisioned from blocks reserved from mobile nodes in the same or similar way mobile phone numbers are provisioned today (e.g. such that they do not overlap with the EID space of any enterprise). These EIDs may be either IPv4 or IPv6 addresses. For example, one EID of UE 101 may be for a public network while another EID of UE 101 may be for a private network; in this case, the "public" EID will be associated with RLOCs from the public Internet, while the "private" EID will be associated with private RLOCs. The relatively-fixed EID of UE 101 allows the LISP-MN's transport connections to survive roaming events.

While the LISP-MN's EIDs may be fixed during roaming events, the LISP-MN's RLOC set comprised of both IPv4 or IPv6 addresses may change. Regarding control plane operation, a roaming event may occur when the LISP-MN receives a new RLOC. See e.g. FIG. 3B where UE 101 relocates and establishes communication with an eNB/AP 320 to roam to an alternate mobile network 310 connected to an alternate mobile network—fabric network gateway 312. Because the new address is a new RLOC from the LISP-MN's perspective, it may update its EID-to-RLOC mapping with the MS. Since the LISP-MN is the authoritative ETR for its EID-prefix, it will register its updated RLOC set. New sessions may be established as soon as the registration process completes.

As described earlier, communication system architecture 100B of FIG. 1B includes fabric network 120 of the enterprise private network may be extended across the mobile network 110 for communication with UEs through use of mobile network—fabric network gateway 150. To help achieve this, mobile network policies of mobile network 110 may be driven by and matched to network fabric policies of fabric network 120, to provide an end-to-end solution for communication with UEs operating in the mobile network 110.

Figure 1D:
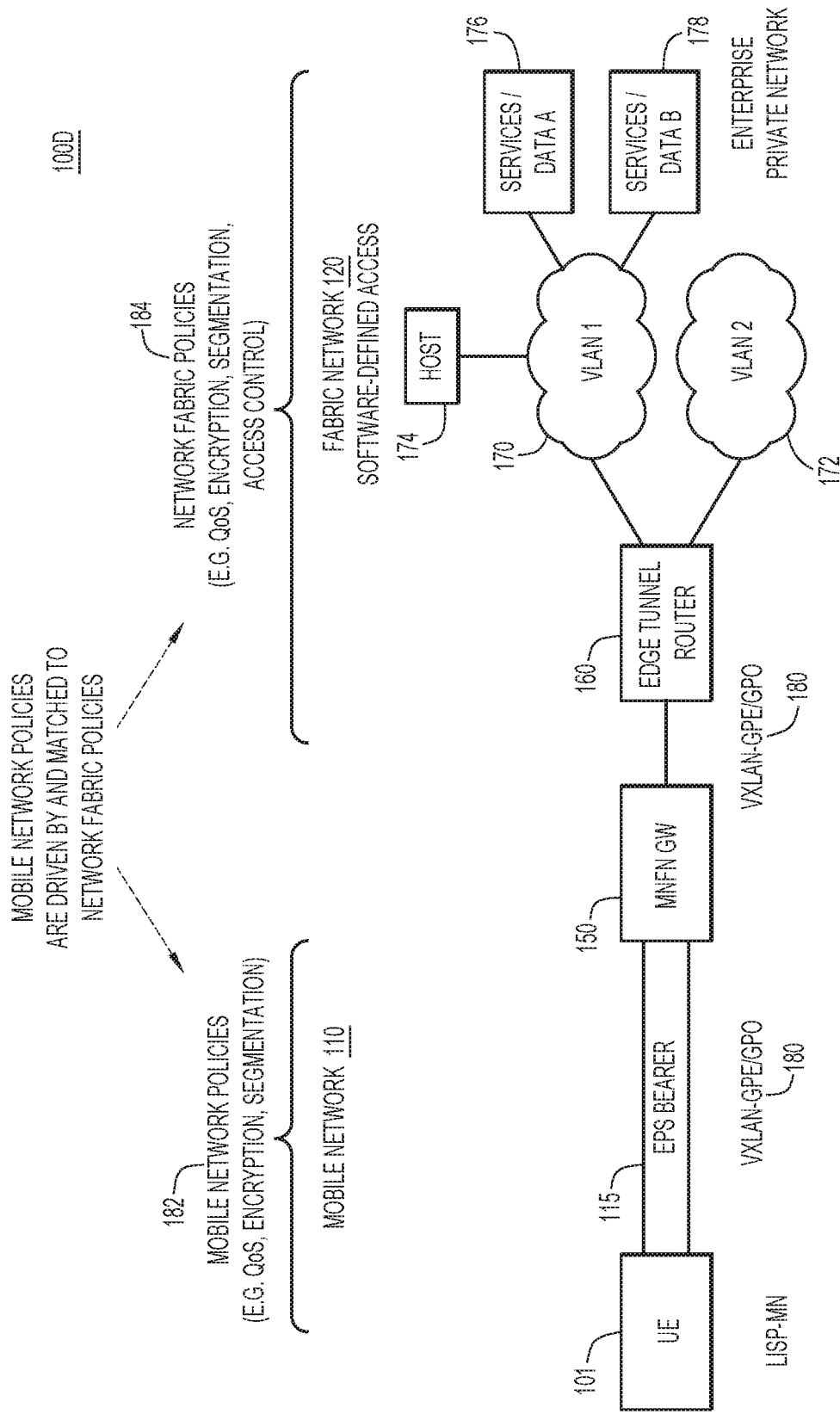
FIG. 1D is a representation of a communication system architecture which is a simplified representation of that shown in FIG. 1B, indicating that mobile network policies of the mobile network may be driven by and matched to network fabric policies of the fabric network according to some implementations of the present disclosure.

To better illustrate in relation to a communication system architecture 100D of FIG. 1D, which is a relevant portion of the communication system architecture 100B of FIG. 1B, it is indicated that mobile network 110 is associated with mobile network policies 182 and that fabric network 120 is associated with network fabric policies 184. Packets may be communicated in mobile network 110 according to mobile network policies 182 which may relate to QoS, encryption grade, type or level, and/or segmentation. On the other hand, packets may be communicated in fabric network 120 in accordance with network fabric policies 184 which may relate to QoS, encryption grade, type, or level, segmentation, and/or access control. As described earlier above, the enterprise private network may provide for segmentation into a plurality of virtual networks according to virtual network identifier, as well as micro-segmentation of each virtual network into a plurality of policy groups according to group identifier. In preferred implementations of the present disclosure, mobile network policies 182 (e.g. as applied to EPS bearer 115) may be driven by and matched to network fabric policies 184 according to at least the group identifier (e.g. SGT) of the group indicated in the packet communications.

Applications of the host device 174 may be applications associated with the fabric network 120 for use with applications, services, and/or data access in the fabric network 120. Similarly, at least some of the applications of UE 101 may be applications associated with the fabric network 120 for use with applications, services, and/or data access in fabric network 120. These applications may be considered as "fabric network" or SDA applications. Different "fabric network" applications may require different QoS and/or encryption treatment, and therefore different bearers in the mobile network may be established and associated with them.

Techniques for use in extending a network fabric across a mobile network will now be described with reference to various flowcharts in the figures. Note that techniques or methods of the present disclosure may be performed at the mobile network—fabric network gateway (or other suitable network node) or a UE. The network node or UE may include at least one or more processors and memory coupled to the one or more processors. The method may be embodied as a computer program product including a non-transitory computer readable medium and instructions stored in the computer readable medium, where the instructions are executable on one or more processors for performing the steps of the method.

FIG. 4 is a flowchart 400 for describing a method for use in extending a network fabric across a mobile network according to some implementations of the present disclosure. The method of FIG. 4 may be performed at a network node, such as a mobile network—fabric network gateway.

In the method of FIG. 4, the network node may facilitate a communication from a host device in a fabric network to a UE operating in a mobile network. Beginning at a start block 402 of FIG. 4, the network node may receive an IP data packet from the fabric network (step 404 of FIG. 4). The IP data packet may include an outer source IP address which is a routing locator of an edge (tunnel) router that forwarded the IP data packet from the host device to the network node. The IP data packet may also include an outer destination IP address which is a routing locator of the network node (e.g. the mobile network—fabric network gateway).

The network node may decapsulate the IP data packet to reveal a decapsulated IP data packet (step 406 of FIG. 4). The decapsulated IP data packet may include an inner source IP address which is an endpoint identifier assigned to the host device. The decapsulated IP data packet may also include an inner destination IP address which is an endpoint identifier assigned to the UE. The decapsulated IP data packet may also include one or more headers which include a virtual network identifier of a virtual network and a group identifier for a group or policy group in the fabric network. In some implementations, the one or more headers may be or include a VXLAN header, and the VXLAN header may include a VNI associated with a VXLAN and an SGT associated with a scalable group.

The network node may re-encapsulate the decapsulated IP data packet to generate a re-encapsulated IP data packet (step 408 of FIG. 4). The re-encapsulated IP data packet may include a new outer source IP address which is a routing locator of the network node. The re-encapsulated IP data packet may also include a new outer destination IP address which is a routing locator assigned to a UE tunnel router of the UE. The network node may send the re-encapsulated IP data packet over a bearer of the mobile network for delivery to the UE (step 410 of FIG. 4).

Notably, the dedicated bearer may be established or selected to satisfy a mobile network policy (e.g. QoS and/or encryption grade or level) that corresponds to or matches the network fabric policy (e.g. QoS and/or encryption grade or level) of the fabric network. The mobile network policy may correspond to or match the network fabric policy according to at least the group identifier of the group or group policy.

At the UE, the tunnel router may perform decapsulation and for delivery to the proper IP stack; the SGACL may be applied for proper access and permissions.

FIG. 5A is a flowchart 500 for describing a method for use in extending a network fabric across a mobile network according to some implementations of the present disclosure. The method may involve the receipt of published policy mappings at a network node (e.g. the mobile network—fabric network gateway) and/or a UE.

Beginning at a start block 502 of FIG. 5A, the network node or UE may receive a publication of policy mappings (step 504 of FIG. 5A). The policy mappings may be mappings between a set of network fabric policy profiles of a fabric network of an enterprise private network and a set of mobile network policy profiles of a mobile network. See e.g. FIGS. 6A-6B and associated description below. In response to any network changes or updates to any of the policies or policy profiles, the network node or UE may receive corresponding publication updates to the policy mappings.

In some implementations of FIG. 5A, the publications and publication updates of policy mappings may be communicated as part of a subscription-based mechanism (e.g. a publish-subscribe mechanism) with a host-tracking database (e.g. HTDB 164) and/or controller/engine (e.g. ISE 162) in the network.

FIG. 5B is a flowchart 510 for describing a method for use in extending a network fabric across a mobile network according to some implementations of the present disclosure. The method may be performed at a network node (e.g. the mobile network—fabric network gateway) and/or a UE. Beginning at a start block 512 of FIG. 5B, the network node or UE may maintain access to stored policy mappings between sets of policy data or profiles (step 514 of FIG. 5B). More particularly, the network node or UE may maintain access to stored policy mappings between a set of network fabric policy profiles of a fabric network of an enterprise private network and a set of mobile network policy profiles of a mobile network. See e.g. FIGS. 6A-6B and associated description below.

In some implementations of FIG. 5B, the network node or UE may store and/or maintain access to such policy mappings in response to receiving a publication and/or a publication update to the policy mappings. See e.g. the method of FIG. 5A described above.

Figure 6A:
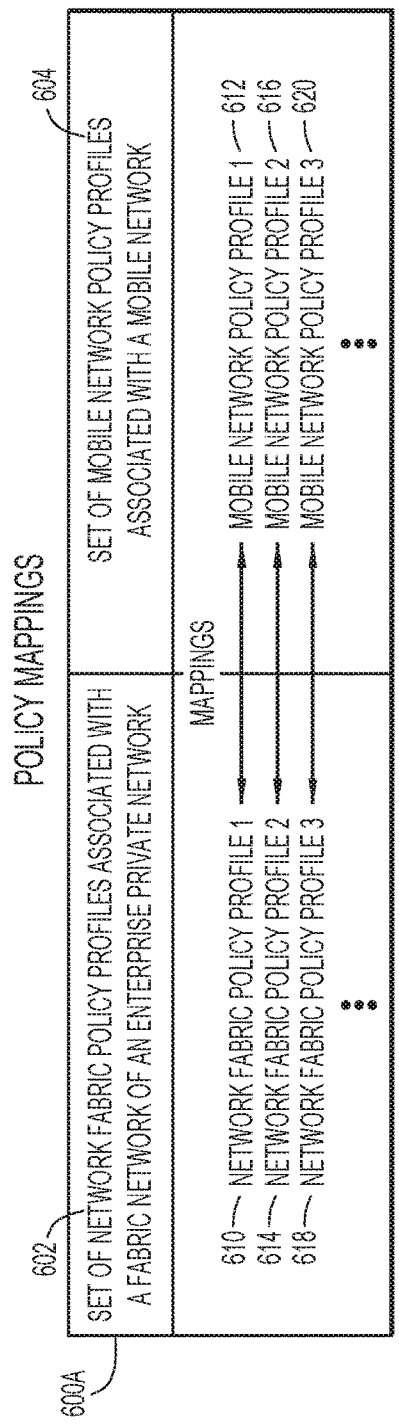
FIGS. 6A-6B are mapping tables which show example policy mappings between a set of network fabric policy profiles associated with the fabric network and a set of mobile network policy profiles of the mobile network.

FIG. 6A is a mapping table 600A which shows example policy mappings between a set of network fabric policy profiles 602 associated with a fabric network of an enterprise private network and a set of mobile network policy profiles 604 of a mobile network. The policies or policy profiles may be or include group policies of a policy group and/or relate to any suitable type of network or communication policy, such as QoS, encryption type, grade, or level, (service or data) access level, or segmentation.

More particularly in FIG. 6A, mapping table 600A includes a mapping between a network fabric policy profile 610 and a mobile network policy profile 612, a mapping between a network fabric policy profile 614 and a mobile network policy profile 616, and a mapping between a network fabric policy profile 618 and a mobile network policy profile 620, etc. Each mapping may be a stored association between policy data or profiles having the same or corresponding criteria. For example, mobile network policy profile 612 may have the same or corresponding policy criteria as network fabric policy profile 610; mobile network policy profile 616 may have the same or corresponding policy criteria as network fabric policy profile 614; and mobile network policy profile 620 may have the same or corresponding policy criteria as network fabric policy profile 618.

Figure 6B:
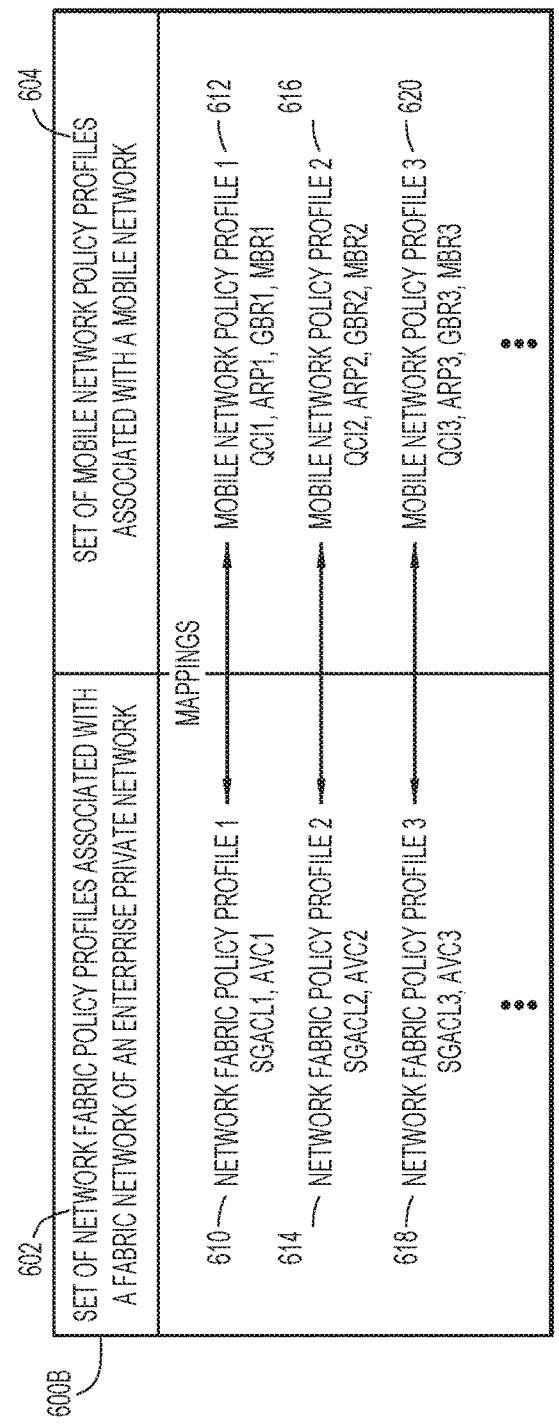

FIG. 6B is a mapping table 600B which shows the same policy mappings as mapping table 600A of FIG. 6A, except that in FIG. 6B each policy profile is shown to include example policy data according to some implementations of the present disclosure. In the example of FIG. 6B, each network fabric policy profile may include a (unique) SGACL and/or application visibility and control (AVC) data. For example, network fabric policy profile 610 may include an SGACL1 and/or an AVC1; network fabric policy profile 614 may include an SGACL2 and/or an AVC2; and network fabric policy profile 618 may include an SGACL3 and/or an AVC3. Also in the example of FIG. 6B, each corresponding mobile network policy profile may include one or more unique values of QCI, ARP, GBR, and MBR. For example, mobile network policy profile 612 may include one or more values of QCI1, ARP1, GBR1, and/or MBR1; mobile network policy profile 616 may include one or more values of QCI2, ARP2, GBR2, and/or MBR2; and mobile network policy profile 620 may include one or more values of QCI3, ARP3, GBR3, and/or MBR3.

Figure 7:
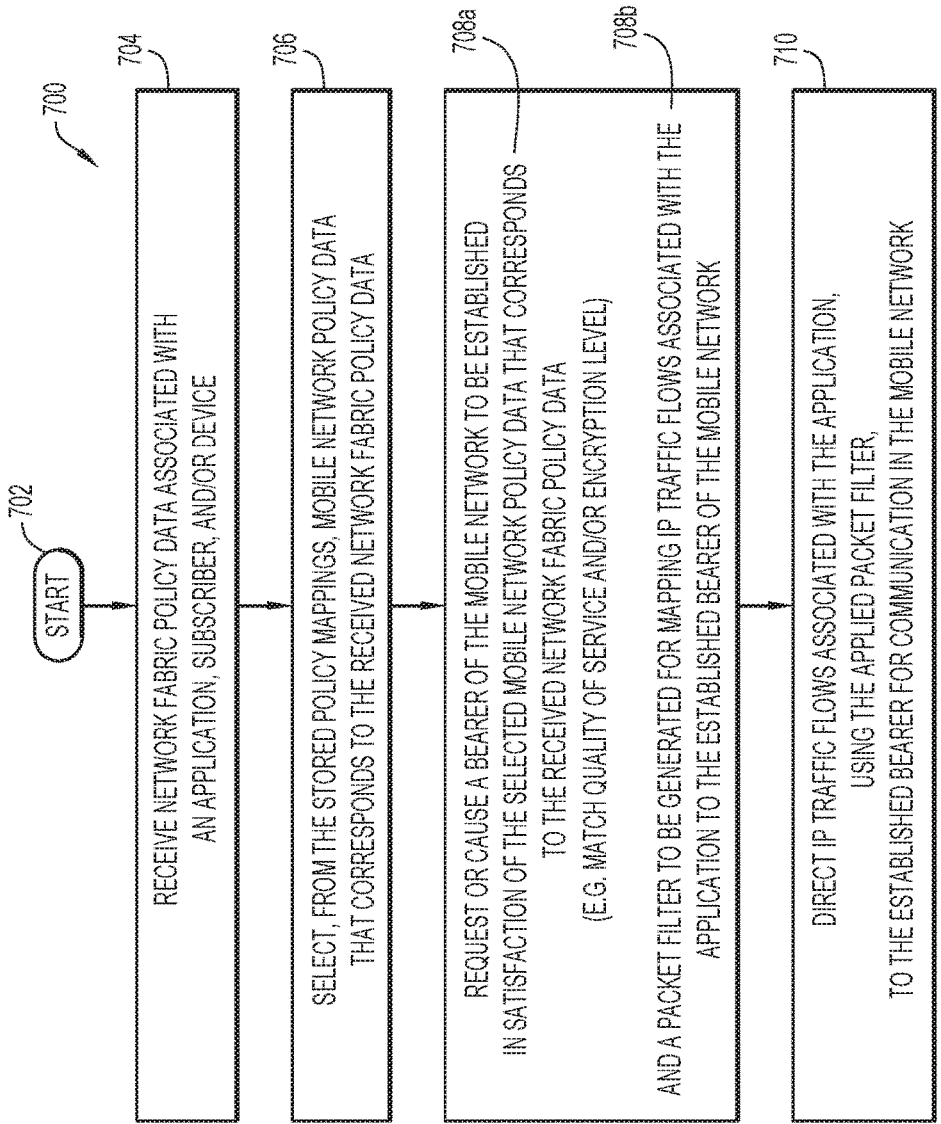
FIG. 7 is a flowchart for describing a method for use in extending the network fabric across the mobile network according to some implementations of the present disclosure, which may be performed by the mobile network—fabric network gateway or the UE.

FIG. 7 is a flowchart 700 for describing a method for use in extending a network fabric across a mobile network according to some implementations of the present disclosure. The method may be performed at a network node, such as a mobile network—fabric network gateway, and/or a UE.

Beginning at a start block 702 of FIG. 7, the network node or UE may receive network fabric policy data associated with an application, subscriber, and/or device (step 704 of FIG. 7). For example, the network fabric policy data may be received as part of a request associated with a particular application at a host of the fabric network or the UE in the mobile network. In response, the network node or UE may select, from the stored policy mappings (e.g. FIGS. 6A-6B), mobile network policy data that corresponds to the received network fabric policy data (step 706 of FIG. 7).

The network node or UE may request or otherwise cause a bearer of the mobile network to be established in satisfaction of the selected mobile network policy data that corresponds to the received network fabric policy data (step 708a of FIG. 7). For example, a bearer associated with a QoS that corresponds to or matches the QoS of the fabric network may be established. Further, encryption may be applied at an encryption grade, type, or level that corresponds to or matches the encryption grade, type, or level of the fabric network.

Additionally, or alternatively, the network node or UE may cause a packet filter to be generated for mapping or directing IP traffic flows associated with the application to the appropriate, established bearer of the mobile network (step 708b of FIG. 7). The network node or UE may then apply the generated packet filter to direct the IP traffic flow associated with the application to the established bearer of the mobile network (step 710 of FIG. 7). Note that the data used for segmentation (e.g. SGT) may be used for the proper generation of the packet filter (TFT) and direction of packets over the proper bearer.

When the method of FIG. 7 is performed by the mobile network—fabric network gateway, step 704 of receiving may occur in response to an application being invoked at the host device and a "new" IP traffic flow from the host device being detected at the network node. This method may be performed when the "fast bearer setup" of FIGS. 8A-8B is not utilized or unavailable.

When the method of FIG. 7 is performed by the UE, the step 704 of receiving may occur in response to the application being invoked at the UE. Also, the tunnel router at the UE may perform decapsulation and for delivery to the proper IP stack; the SGACL at the UE may be applied for proper access and permissions.

Figure 8:
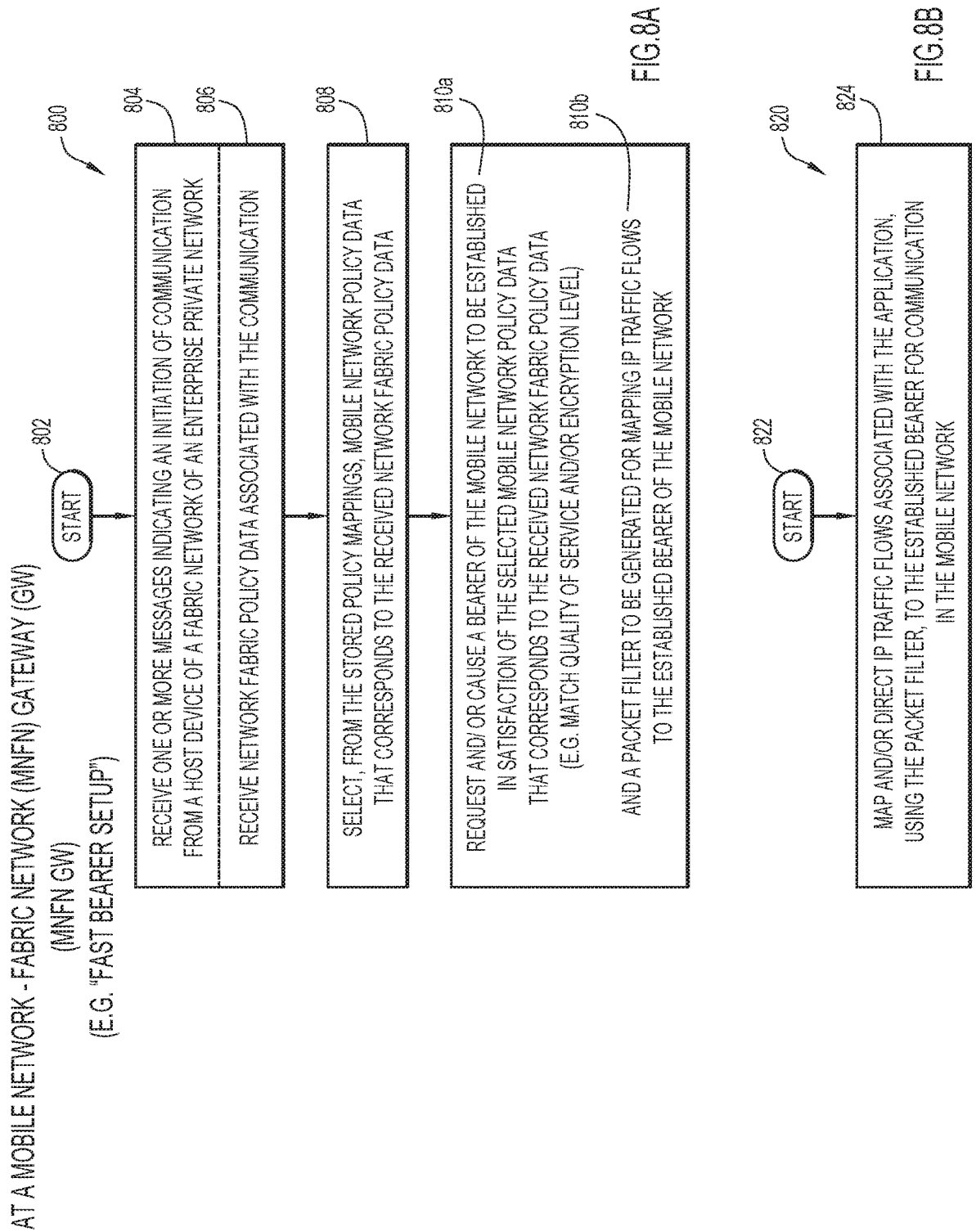
FIGS. 8A-8B are flowcharts for describing a method for use in extending the network fabric across the mobile network according to some implementations of the present disclosure ("fast bearer setup"), which may be performed by the mobile network—fabric network gateway.

FIGS. 8A and 8B are flowcharts 800, 820 for describing a method for use in extending a network fabric across a mobile network according to some implementations of the present disclosure. The method may be performed at a network node, such as the mobile network—fabric network gateway. The method may be considered or referred to as a technique for a "fast" bearer setup.

Beginning at a start block 802 of FIG. 8A, the network node may receive one or more messages indicating an initiation of communication from a host device of the fabric network to a UE of a mobile network (step 804 of FIG. 8A). The network node may then receive network fabric policy data associated with the communication (step 806 of FIG. 8A). Here, the network fabric policy data may be specifically associated with an application, a subscriber, and/or a device. In some implementations, the network fabric policy data may be received in the one or more messages indicating the communication.

In some implementations of step 804, the network node may receive the one or more messages in response to a subscription to a subscription-based notification mechanism with a host-tracking database (e.g. HTDB 164) and/or controller/engine (e.g. ISE 162). Here, notifications and/or the appropriate data may be received in response to access by the host device indicating an initiation of communication to the UE.

In response, the network node may select, from the stored policy mappings (e.g. FIGS. 6A-6B), mobile network policy data that corresponds to the received network fabric policy data (step 808 of FIG. 8A). The network node may request or otherwise cause a bearer of the mobile network to be established in satisfaction of the selected mobile network policy data that corresponds to the received network fabric policy data (step 810a of FIG. 8A). For example, a bearer associated with a QoS that corresponds to or matches the QoS of the fabric network may be established. Further, encryption may be applied at an encryption grade, type, or level that corresponds to or matches the encryption grade, type, or level of the fabric network. The network node may also cause a packet filter to be generated for mapping or directing (subsequent) IP traffic flows associated with the application to the appropriate bearer of the mobile network (step 810b of FIG. 8A). Note that the data used for segmentation (e.g. SGT) may be used for the proper generation of the packet filter (TFT) and direction of packets over the proper bearer.

According to FIG. 8A, the bearer may (or may not) be setup in advance of receipt of IP traffic flow from the host device. Continuing with the flowchart 820 of FIG. 8B, beginning at a start block 822, the network node may now receive the "new" IP traffic flow and apply the previously-generated packet filter in order to direct the IP traffic flow associated with the application to the pre-established bearer of the mobile network (step 824 of FIG. 8B).

Figure 9:
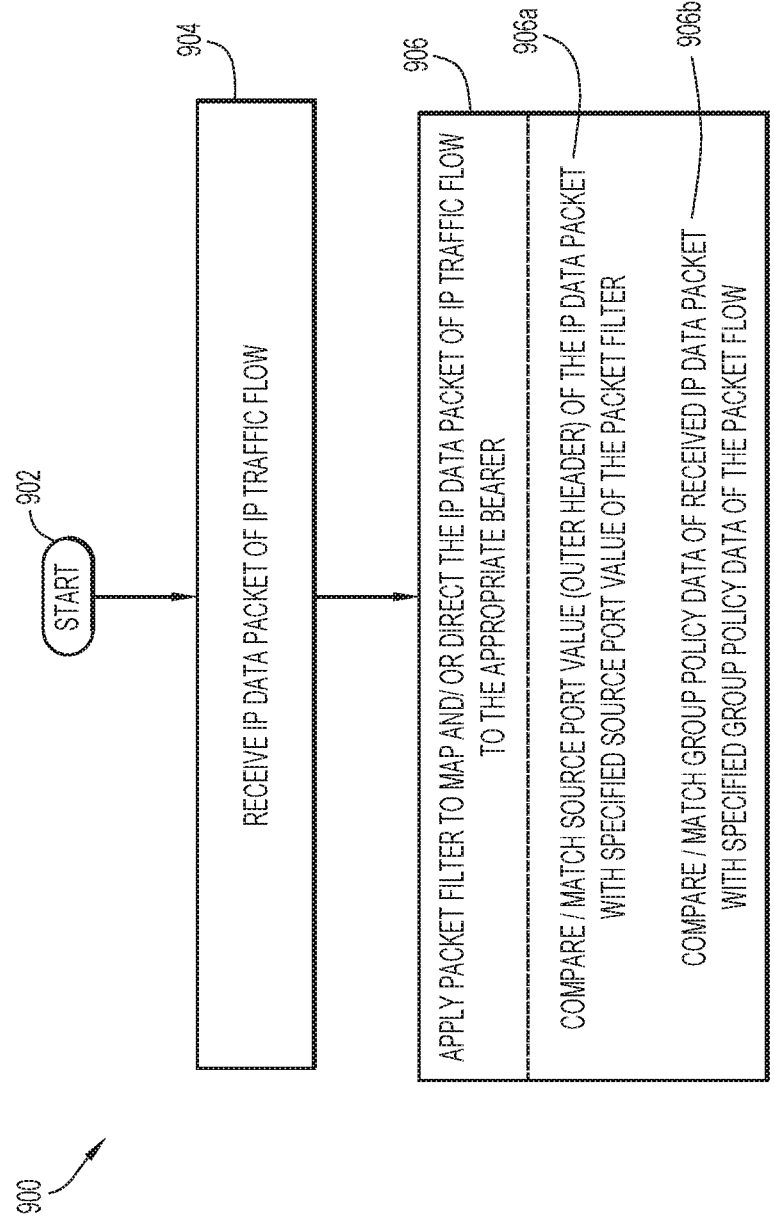
FIG. 9 is a flowchart for describing a method for use in extending the network fabric across the mobile network according to some implementations of the present disclosure, which may be performed by the mobile network—fabric network gateway or the UE.

FIG. 9 is a flowchart 900 for describing a method for use in extending a network fabric across a mobile network according to some implementations of the present disclosure. The method may be performed at a network node, such as a mobile network—fabric network gateway, and/or a UE. In the method, the mobile network—fabric network gateway may have a packet filter of a TFT for DL communications with the UE, whereas the UE may have a packet filter of a TFT for UL communications that will reach the mobile network—fabric network gateway. These packet filters (TFT) may have been generated in relation to the methods of FIG. 7 or 8A-8B.

Beginning at a start block 902 of FIG. 9, an IP data packet of an IP traffic flow may be received (step 904 of FIG. 9). One or more packet filters of the TFT may be applied to the IP traffic flow, in order to direct the IP data packet to the appropriate bearer (step 906 of FIG. 9). In some implementations, the packet filter may assess the outer IP header of the encapsulated IP data packet.

Here, the packet filter may compare and/or match a source port value of the outer IP header with a specified source port value of the packet filter. With reference back to FIG. 2B, a source port value 250 of the UDP header may be a hash of the inner L2/L3/L4 headers of the original frame, and classification may be based on the same.

Additionally, or alternatively, in some implementations, the packet filter may have access to the one or more (e.g. VXLAN) headers 210 of the (inner) IP packet of the overlay 220. Here, the packet filter may compare and/or match an identifier of a group policy with a specified identifier of the group policy. See metadata 230 in FIGS. 2A-2B including the VNI of the VXLAN and the SGT of the policy group.

In general, ingress traffic flows may be classified into different service data flows (SDFs) having different QoS classes based on the packet filters. SDF QoS may be maintained and controlled through the EPS bearers in the mobile network. The ingress traffic flows may be matched against the packet filters (i.e. SDF templates for SDFs or TFTs for EPS bearers) to detect the appropriate EPS bearers. In a further illustrative example, each packet filter may be associated an identifier and to one or more of the following additional elements: (a) a remote IP Address and subnet mask; (b) a protocol number for IPv4/next header for IPv6; (c) a destination port number; (d) a source port number; (e) a Security Parameter Index (SPI); (f) a type of service for IPv4 or traffic class for IPv6 and mask; (g) a flow label (IPv6); and (h) a packet flow EPI. According to some implementations of the present disclosure with reference again to FIG. 2B, what may be additionally or alternatively utilized is the source port value 250 of the UDP header which is a hash of the inner L2/L3/L4 and/or one or more (e.g. VXLAN) headers 210 of the (inner) IP packet of overlay 220.

As described earlier, traffic shaping techniques may be employed according to QoS in order to limit the flow or bandwidth over an established bearer. Dedicated bearers may be associated with a GBR or a non-GBR. Packet losses related to congestion typically do not occur with GBR bearers. GBR bearers may be suitable for services such as voice call services. Non-GBR bearers do not guarantee bit rate and therefore services utilizing non-GBR bearers should prepare for packet losses related to congestion. Non-GBR bearers may be suitable for services such as e-mail services. Each EPS bearer may be associated with a QCI which specifies the QoS treatment of its user plane flows. QCI characteristics include the packet delay budget, priority, and packet error loss rate. QoS parameters include GBR, MBR, and ARP. If there are limited resources, then the mobile network may use the ARP to decide whether accept or reject the new bearer establishment or modification request. For non-GBR bearers, the operator may restrict the total amount of bit-rate consumed by a single user with use of AMBR.

FIG. 10A is an illustrative representation of a plurality of Service Data Flow (SDF) templates 1000, and FIG. 10B is a plurality of Traffic Flow Templates (TFT) 1030 which may be utilized in some implementations of the present disclosure. In FIG. 10A, SDF templates 1000 include an SDF template 1002 having one or more packet filters 1004, an SDF template 1012 having one or more packet filters 1014, and an SDF template 1022 having one or more packet filters 1024. IP data packet flows may be received, where one or more of the SDF templates 1000 may be applied. SDF template 1002 may be applied to produce an SDF1 associated with a first QoS (i.e. QoS1), SDF template 1012 may be applied to produce an SDF2 associated with a second QoS (i.e. QoS2), and SDF template 1022 may be applied to produce an SDF3 associated with a third QoS (i.e. QoS3).

In FIG. 10B, TFTs 1030 include a TFT 1032 having one or more packet filters 1034, a TFT 1042 having one or more packet filters 1044, and a TFT 1052 having one or more packet filters 1054. Each TFT 1030 is associated with a unique QoS; for example, TFT 1032 is associated with QoS1 (e.g. QC11, ARP1, MBR1, and/or GBR1); TFT 1042 is associated with QoS2 (e.g. QC12, ARP2, MBR2, and/or GBR2); and TFT 1052 is associated with QoS3 (e.g. QC13, ARP3, MBR3, and/or GBR3). Each TFT 1030 is also associated with a unique dedicated bearer having an ID associated therewith.

A plurality of SDFs may be received from the output of the SDF templates 1000, where one or more of the TFTs 1030 may be applied to map or direct SDFs to the appropriately established dedicated bearer. For example, TFT 1032 may map or direct SDFs to a dedicated bearer 1036 associated with bearer ID1; TFT 1042 may map or direct SDFs to a dedicated bearer 1046 associated with bearer ID2; and TFT 1052 may map or direct SDFs to a dedicated bearer 1056 associated with bearer ID3. Each dedicated bearer may be associated with a unique QoS; for example, bearer 1036 may be associated with QoS1 (e.g. QC11, ARP1, MBR1, GBR1, UE-AMBR1, and/or APN-AMBR1); bearer 1046 may be associated with QoS2 (e.g. QC12, ARP2, MBR2, GBR2, UE-AMBR2, and/or APN-AMBR2; and bearer 1056 may be associated with QoS3 (e.g. QC13, ARP3, MBR3, GBR3, UE-AMBR3, and/or APN-AMBR3).

FIG. 11 is a table 1100 for showing relationships between different quality indicators (e.g. QCI) associated with dedicated bearers of a mobile network and example services that may be associated therewith. In table 1100, different values of QCI may be combined with different resource types to support different services. Example services that are associated with unique QCIs as indicated include conversational voice; conversational video (live streaming); non-conversational video (buffered streaming); real-time gaming; IMS signaling; voice, video (live streaming), an interactive gaming; video (buffered streaming); and TCP-based, chat, FTP, p2p file sharing, and progressive video.

FIG. 12 is a TFT 1200 that shows example types of classification for filtering, mapping or directing IP traffic flows to their appropriate dedicated bearers, each of which may be identified by a dedicated radio bearer ID. In the example of FIG. 12, TFT 1200 is for a UE for the UL; note however that classification for filtering, mapping or directing IP traffic flows at the mobile network—fabric network gateway for DL may be correspond and be similar to the examples shown herein. TFT 1200 may include an UL packet filter ID associated with each one of a plurality of packet filter, as well as a packet filter evaluation precedence for each packet filter. In this illustrative example shown, classifier items may include one or more of a protocol number (IPv4)/next header (IPv6); a remote address and subnet mask; a single local port (UE); a local port range (UE); a single remote port range (UE); a remove port range; an IPSec SPI range; a type of service (IPv4)/traffic class (IPv6) and Mask; and a flow label (IPv6). Again, what may be additionally or alternatively utilized is the source port value 250 of the UDP header which is a hash of the inner L2/L3/L4 and/or one or more (e.g. VXLAN) headers 210 of the (inner) IP packet of overlay 220.

Figure 13:
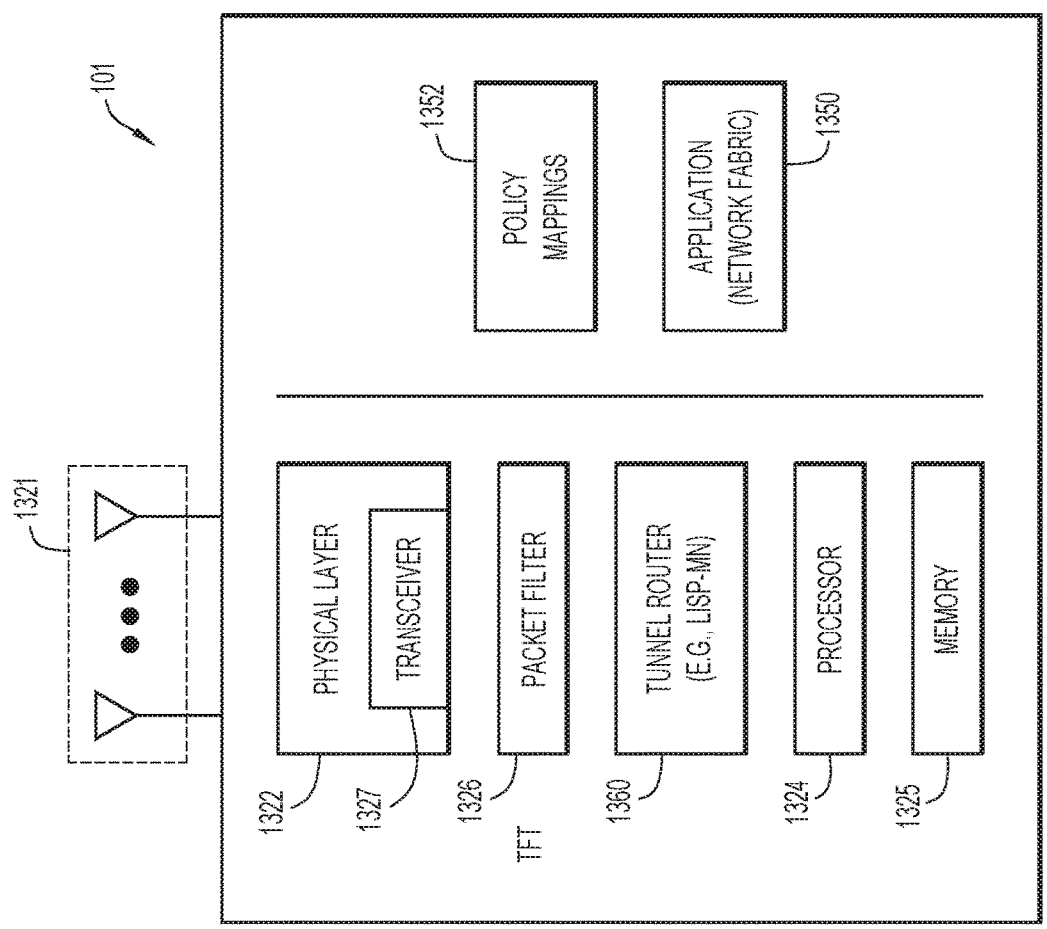
FIG. 13 is a schematic block diagram of a UE according to some implementations of the present disclosure.

FIG. 13 is a schematic block diagram of a UE 101 according to some implementations of the present disclosure. UE 101 of FIG. 13 may include one or more processors 1324 and a memory 1325 which may be configured to perform and/or control operations as described herein. UE 101 may further include physical (PHY) layer circuitry 1322 having a transceiver 1327 for transmitting and receiving signals to and from an eNB (FIG. 1B) using one or more antennas 1321. One or more applications 1350 associated with the fabric network (e.g. software-defined access) may be stored in UE 101 for execution. A tunnel router 1360 and related processing may be used for processing according to LISP-MN. Further, UE 101 may receive and store policy mappings 1352 as described herein, which may be used to establish an appropriate dedicated bearer for communications as well as one or more packet filters 1326 of a TFT. Note that a high-level, simplified architecture of UE 101 has been described for illustrative clarity; a person skilled in the art would appreciate that other components may be used in addition to the ones shown.

Figure 14:
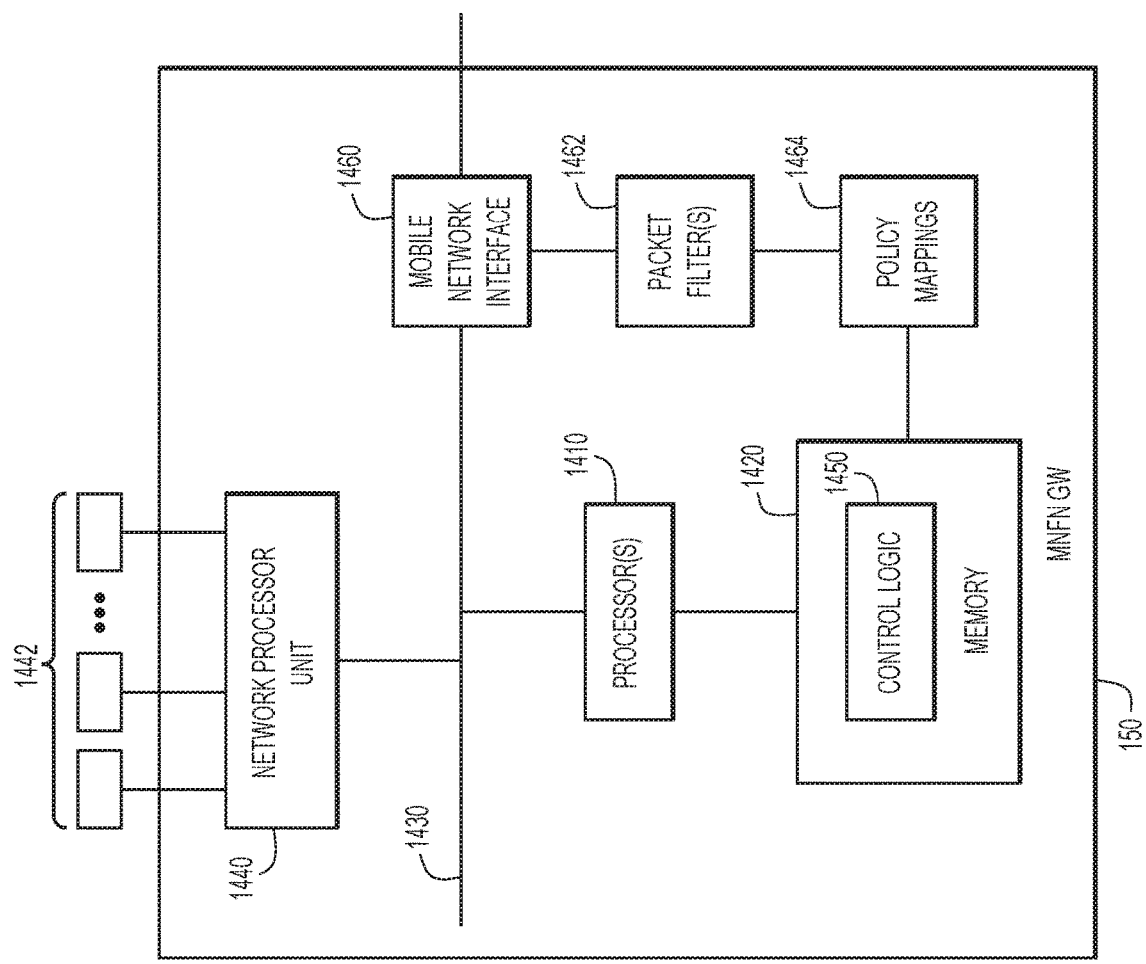
FIG. 14 is a schematic block diagram of a network node, such as the mobile network—fabric network gateway, according to some implementations of the present disclosure.

FIG. 14 is a schematic block diagram of a network node, such as a mobile network—fabric network gateway 150, according to some implementations of the present disclosure. The mobile network—fabric network gateway 150 may include one or more processors 1410 for control, memory 1420, a bus 1430, and a network processor unit 1440. The processor 1410 may be a microprocessor or microcontroller. The network processor unit 1440 may include one or more Application Specific Integrated Circuits (ASICs), linecards, etc., and facilitates network communications between this network node and other network nodes.

There are a plurality of network ports 1442 at which the node receives packets and from which the mobile network—fabric network gateway 150 sends packets. There is also a mobile network interface 1460 for connection to the mobile network. The processor 1410 may execute instructions associated with software stored in memory 1420. Specifically, the memory 1420 stores instructions for control logic 1450 that, when executed by the processor 1410, causes the processor 1410 to perform various operations on behalf of the node 1400 as described herein. The memory 1420 also stores configuration information received from a network controller to configure the network node according to desired network functions. It should be noted that in some embodiments, the control logic 1450 may be implemented in the form of firmware implemented by one or more ASICs as part of the network processor unit 1440. The mobile network—fabric network gateway 150 may receive and store policy mappings 1464 as described herein, which may be used to establish an appropriate dedicated bearer for communications as well as one or more packet filters 1462 of a TFT.

The memory 1420 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 1420 may comprise one or more tangible (non-transitory) computer readable storage media (e.g., a memory device) encoded with software comprising computer executable instructions and when the software is executed (by the processor 1410) it is operable to perform certain network node operations described herein.

Note that network node and the UE may have several separate functional elements, although one or more of the functional elements may be combined and may be implemented by combinations of software-configured elements and/or other hardware elements. Functional elements may refer to one or more processes operating on one or more processing elements. Examples of software and/or hardware configured elements include Digital Signal Processors (DSPs), one or more microprocessors, DSPs, Field-Programmable Gate Arrays (FPGAs), ASICs, Radio-Frequency Integrated Circuits (RFICs), etc.

Implementations of the present disclosure have been shown in the figures to apply to a 4G LTE based mobile network; however, implementations may be readily applied to other suitable types of mobile networks, such as 5G networks. In such implementations, the MNFN GW may be associated with a user plane function (UPF) or UPF instance.

As described previously, 4G LTE uses EPS bearers, each of which is assigned an EPS bearer ID, and QoS is enforced at the EPS bearer level. On the other hand, 5G uses QoS flows, each of which is identified by a QoS Flow Identifier (QFI), and QoS is enforced at the QoS flow level. In 5G, QFI may be used by network elements for mapping SDFs to QoS flows. One or more SDFs may be transported in the same QoS flow if they share the same policy and charging rules. All traffic in the same QoS flow may receive the same QoS treatment.

In 5G, each QoS flow may be defined by a QoS profile. The QoS profile may identify QoS characteristics with a 5G QoS Identifier (5QI) and Allocation and Retention Priority (ARP) parameters, which define a Priority Level (PL) and whether the QoS flow can pre-empt another flow or if it can be pre-empted. The ARP may be used for admission control. ARP values determine which flow takes precedence. Like 4G, 5G QoS provides a Non-GBR and GBR classification. In 5G, GBR and Non-GBR classifications are at the QoS flow level and are part of the QoS profile. For Non-GBR flows, there is also an AMBR that limits the overall usage across all SDFs within that QoS flow. For GBR flows, there is a Guaranteed Flow Bit Rate (GFBR), as well as a Maximum Flow Bit Rate (MFBR) and a maximum packet loss rate.

As is known, a 5G network includes an Access and Mobility Management Function (AMF), a Session Management Function (SMF), and a Policy Control Function (PCF). In typical operation, the SMF manages a Protocol Data Unit (PDU) session and its associated QoS flows, and assigns a QFI and QoS profile to a flow based on information provided by the PCF. The SMF may provide the UPF with Packet Detection Rules (PDRs) for mapping SDFs to the QoS flows. The SMF may also send the QoS profile to a next-generation Node B (i.e. gNB) via the AMF. The gNB may map the QoS flow to a specific data radio bearer. The AMF may convey the QoS rules to the UE to aid in the mapping SDF flows to a 5G QoS flow and the correct DRB.

Accordingly, in some implementations of a 5G network, policy mappings may be made between a set of network fabric policy profiles of a fabric network and a set of 5G network policy profiles of a 5G network according to the same or similar principles described above. Also, instead of a bearer being established, a QoS flow of a PDU session in the 5G network may be established according to the same or similar principles and operation described above. Further, instead of a packet filter of a TFT being generated and applied, a packet detection rule or "PDR" may be generated and applied in the 5G network according to the same or similar principles and operation described above.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, first policy data could be termed second policy data, and similarly, second policy data could be termed first policy data, without changing the meaning of the description, so long as all occurrences of the "first policy data" are renamed consistently and all occurrences of the "second policy data" are renamed consistently. The first policy data and second policy data are both policy data, but they are not the same policy data.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method of a network node configured to facilitate communications between a host device or a server of an enterprise private network and a user equipment (UE) connected in a mobile network, the method comprising:
   at the network node which serves as a gateway between the mobile network and an external packet data network comprising the enterprise private network,
      receiving and processing one or more Internet Protocol (IP) packets of an IP traffic flow for an application or a service of the host device or the server, which is communicated via a network fabric of the enterprise private network in accordance with network fabric policy data which includes a group policy associated with the application or the service that is enforced in the network fabric of the enterprise private network;
      selecting mobile network policy data in satisfaction of the network fabric policy data, based on stored policy mappings between a set of network fabric policy profiles of the network fabric and a set of mobile network policy profiles of the mobile network;
      after selecting the mobile network policy data in satisfaction of the network fabric policy data, requesting a bearer or a Quality of Service (QoS) flow of the mobile network to be established in satisfaction of the mobile network policy data;
      wherein each one of the one or more IP packets of the IP traffic flow comprises an outer IP packet that encapsulates an inner IP packet in accordance with a tunneling protocol, the inner IP packet having one or more virtual network headers indicating the group policy associated with the application or the service;
      wherein processing the one or more IP packets of the IP traffic flow comprises, for each IP packet, decapsulating the outer IP packet and re-encapsulating the inner IP packet of the outer IP packet in accordance with the tunneling protocol for producing one or more corresponding IP packets of a corresponding IP traffic flow; and
      directing the one or more corresponding IP packets of the corresponding IP traffic flow over the bearer or the QoS flow of the mobile network for communication to the UE connected in the mobile network.

2. The method of claim 1, which is performed by the network node comprising a mobile network-fabric network gateway.

3. The method of claim 1, wherein the tunneling protocol comprises a Locator ID Separation Protocol (LISP).

4. The method of claim 1, wherein the network fabric comprises a software-defined access network.

5. The method of claim 1 further comprising:
   at the network node,
      causing a traffic flow template (TFT) or a packet detection rule (PDR) to be generated for the bearer or the QoS flow, and applying the TFT or the PDR in order to direct the one or more corresponding IP packets of the corresponding IP traffic flow over the bearer or the QoS flow.

6. The method of claim 1, wherein the network fabric policy data which includes the group policy is defined by at least a scalable or security group tag (SGT).

7. The method of claim 6, wherein the mobile network policy data comprises at least one of a quality of service (QoS) class identifier (QCI), a QoS policy, an allocation and retention policy (ARP), a guaranteed bit rate (GBR), and a maximum bit rate (MBR).

8. The method of claim 1, further comprising:
   at the network node,
      performing the selecting and the requesting in response to receiving one or more messages indicating an initiation of the communications from the host device or server; and after requesting the bearer or the QoS flow to be established, performing the receiving, the processing, and the directing.

9. The method of claim 1, further comprising:
receiving policy mappings in accordance with a subscription-based mechanism with a controller or a host-tracking database, and storing the policy mappings as the stored policy mappings in memory.

10. The method of claim 1, wherein the inner IP packet has the one or more virtual network headers which include an identifier of a virtual network and an identifier of a policy group associated with the group policy of the network fabric, and wherein decapsulating further comprises:
decapsulating the outer IP packet to reveal the inner IP packet having the one or more virtual network headers which include the identifier of the virtual network and the identifier of the policy group associated with the group policy of the network fabric.

11. The method of claim 10, further comprising:
at the network node,
determining the network fabric policy data in satisfaction of the group policy as identified from the one or more virtual network headers of the inner IP packet, wherein selecting the mobile network policy data is performed after determining the network fabric policy data.

12. The method of claim 10, wherein re-encapsulating further comprises:
re-encapsulating the inner IP packet to form a new outer IP packet, the new outer IP packet including a source IP address comprising a first routing locator of the tunneling protocol that is assigned to the network node and a destination IP address comprising a second routing locator of the tunneling protocol that is dynamically assigned to a tunnel router configured in the UE.

13. The method of claim 12, wherein:
the tunneling protocol comprises a Locator ID Separation Protocol (LISP),
the UE having the tunnel router comprises a LISP Mobile Node (LISP-MN),
the first routing locator comprises a first Routing Locator (RLOC) of the LISP, and
the second routing locator comprises a second RLOC of the LISP.

14. A mobile network-fabric network gateway configured to facilitate communications between a host device or a server of an enterprise private network and a user equipment (UE) connected in a mobile network, the mobile network-fabric network gateway comprising:
a first interface for connecting to the mobile network;
a second interface for connecting to an external packet data network comprising the enterprise private network;
a memory; and
one or more processing elements configured to:
receive and process one or more Internet Protocol (IP) packets of an IP traffic flow for an application or a service of the host device or the server, which is communicated via a network fabric of the enterprise private network in accordance with network fabric policy data which includes a group policy associated with the application or the service that is enforced in the network fabric of the enterprise private network;
select mobile network policy data in satisfaction of the network fabric policy data, based on stored policy mappings between a set of network fabric policy profiles of the network fabric and a set of mobile network policy profiles of the mobile network;
after the mobile network policy data are selected in satisfaction of the network fabric policy data, request a bearer or a Quality of Service (QoS) flow of the mobile network to be established in satisfaction of the mobile network policy data;
wherein each one of the one or more IP packets of the IP traffic flow comprises an outer IP packet that encapsulates an inner IP packet in accordance with a tunneling protocol, the inner IP packet having one or more virtual network headers indicating the group policy associated with the application or the service;
wherein the one or more IP packets of the IP traffic flow are each processed by decapsulating the outer IP packet and re-encapsulating the inner IP packet of the outer IP packet in accordance with the tunneling protocol to produce one or more corresponding IP packets of a corresponding IP traffic flow; and
direct the one or more corresponding IP packets of the corresponding IP traffic flow over the bearer or the QoS flow of the mobile network for communication to the UE connected in the mobile network.

15. The mobile network-fabric network gateway of claim 14, wherein the one or more processing elements are further configured to:
cause a traffic flow template (TFT) or a packet detection rule (PDR) to be generated for the bearer or the QoS flow, and apply the TFT or the PDR in order to direct the one or more corresponding IP packets of the corresponding IP traffic flow over the bearer or the QoS flow.

16. The mobile network-fabric network gateway of claim 14, wherein:
the network fabric policy data which includes the group policy is defined by at least a scalable or security group tag (SGT), and
the mobile network policy data comprises at least one of a quality of service (QoS) class identifier (QCI), a QoS profile, an allocation and retention policy (ARP), a guaranteed bit rate (GBR), and a maximum bit rate (MBR).

17. The mobile network-fabric network gateway of claim 14, wherein:
the inner IP packet has the one or more virtual network headers which include an identifier of a virtual network and an identifier of a policy group associated with the group policy of the network fabric,
the one or more processing elements are configured to process each one of the one or more IP packets of the IP traffic flow by:
decapsulating the outer IP packet to reveal the inner IP packet having the one or more virtual network headers which include the identifier of the virtual network and the identifier of the policy group associated with the group policy of the network fabric, and
re-encapsulating the inner IP packet to form a new outer IP packet, the new outer IP packet including a source IP address comprising a first routing locator of the tunneling protocol that is assigned to the mobile network-fabric network gateway and a destination IP address comprising a second routing locator of the tunneling protocol that is dynamically assigned to a tunnel router configured in the UE.

18. A mobile node which comprises a user equipment (UE) configured for operation in a mobile network for communications with a host device or a server connected in an external packet data network comprising an enterprise private network, the mobile node comprising:
- one or more mobile network transceivers configured to connect the mobile node which comprises the UE in the mobile network;
- a memory for storing an application associated with the enterprise private network; and
- one or more processing elements configured to:
  - receive network fabric policy data which includes a group policy associated with the application that is enforced in a network fabric of the enterprise private network;
  - select mobile network policy data in satisfaction of the network fabric policy data, based on stored policy mappings between a set of network fabric policy profiles of the network fabric and a set of mobile network policy profiles of the mobile network;
  - after the mobile network policy data are selected in satisfaction of the network fabric policy data, request a bearer or a Quality of Service (QoS) flow of the mobile network to be established in satisfaction of the mobile network policy data;
  - receive and process one or more Internet Protocol (IP) packets of an IP traffic flow from the application, which includes encapsulating, with use of a tunnel router configured in the mobile node which comprises the UE, each IP packet in accordance with a tunneling protocol for producing one or more corresponding IP packets of a corresponding IP traffic flow; and
  - direct the one or more corresponding IP packets of the corresponding IP traffic flow over the bearer or the QoS flow of the mobile network for communication to a gateway between the mobile network and the external packet data network comprising the enterprise private network.

19. The mobile node which comprises the UE of claim 18, wherein the one or more processing elements are further configured to:
- cause a traffic flow template (TFT) or a packet detection rule (PDR) to be generated for the bearer or the QoS flow, and apply the TFT or the PDR in order to direct the one or more corresponding IP packets of the corresponding IP traffic flow over the bearer or the QoS flow.

20. The mobile node which comprises the UE of claim 18, wherein:
- each one of the one or more IP packets of the IP traffic flow comprises a source IP address of the mobile node, a destination IP address of the host device or server, and one or more virtual network headers which include an identifier of a virtual network and an identifier of a policy group associated with the group policy of the network fabric,
- the one or more processing elements are configured to process the one or more IP packets of the IP traffic flow, which further includes encapsulating, with use of the tunnel router configured in the mobile node, each IP packet to form an outer IP packet having an outer source IP address and an outer destination IP address, the outer source IP address comprising a first routing locator of the tunneling protocol that is dynamically assigned to the tunnel router configured in the mobile node, the outer destination IP address comprising a second routing locator of the tunneling protocol that is assigned to the gateway,
- the tunneling protocol comprises a Locator ID Separation Protocol (LISP), and the mobile node which comprises the UE configured with the tunnel router comprises a LISP Mobile Node (LISP-MN).

* * * * *